United States Patent
Morichi et al.

(10) Patent No.: US 8,421,172 B2
(45) Date of Patent: Apr. 16, 2013

(54) SIMPLIFIED SILICON DRIFT DETECTOR AND WRAPAROUND NEUTRON DETECTOR

(75) Inventors: Massimo Morichi, Madison, CT (US); Olivier Evrard, Brussels (BE); Marijke Keters, Leuven (BE); Frazier Bronson, Branford, CT (US); Mathieu Morelle, Hannut (BE); Paul Burger, Wolfsheim (BE)

(73) Assignee: Canberra Industries, Inc., Meriden, CT (US)

( * ) Notice: Subject to any disclaimer, the term of this patent is extended or adjusted under 35 U.S.C. 154(b) by 187 days.

(21) Appl. No.: 12/838,267

(22) Filed: Jul. 16, 2010

(65) Prior Publication Data

US 2011/0012216 A1    Jan. 20, 2011

Related U.S. Application Data

(60) Provisional application No. 61/226,185, filed on Jul. 16, 2009.

(51) Int. Cl.
*H01L 21/00* (2006.01)

(52) U.S. Cl.
USPC .............. 257/429; 257/428; 257/E31.086; 438/57

(58) Field of Classification Search .............. 257/429, 257/E31.086, 428; 438/57
See application file for complete search history.

(56) References Cited

U.S. PATENT DOCUMENTS

| | | | |
|---|---|---|---|
| 4,837,607 A | | 6/1989 | Kemmer et al. |
| 6,218,668 B1 * | | 4/2001 | Luke ................. 250/370.01 |
| 6,455,858 B1 * | | 9/2002 | Patt et al. ............ 250/370.14 |
| 6,521,894 B1 * | | 2/2003 | Iwanczyk et al. ..... 250/370.11 |
| 6,541,836 B2 * | | 4/2003 | Iwanczyk et al. ........ 257/429 |
| 7,105,827 B2 | | 9/2006 | Lechner et al. |
| 7,238,949 B2 | | 7/2007 | Struder et al. |
| 7,705,320 B2 * | | 4/2010 | Soldner ............... 250/370.13 |
| 2002/0139970 A1 * | | 10/2002 | Iwanczyk et al. .......... 257/21 |
| 2010/0264319 A1 * | | 10/2010 | Morichi et al. ............ 250/362 |

OTHER PUBLICATIONS

Alberti, et al.; "Advanced Monolithic Arrays of Silicon Drift Detectors for Elemental Mapping Applications"; SNIC Symposium, Stanford, California; Apr. 3-6, 2006; p. 1-6.
Lechner, et al.; "Silicon Drift Detectors for high Resolution, High Count Rate X-Ray Spectroscopy at Room Temperature"; JCPDS, International Centre for Diffraction Data; 2004; Advances in X-ray Analysis (vol. 47); pp. 53-58.

(Continued)

*Primary Examiner* — Jarrett Stark
*Assistant Examiner* — Nicholas Tobergte
(74) *Attorney, Agent, or Firm* — David W. Carstens; Kevin M. Klughart; Carstens & Cahoon, LLP

(57) ABSTRACT

A large area SDD detector having linear anodes surrounded by steering electrodes and having an oblong, circular, hexagonal, or rectangular shape. The detectors feature stop rings having a junction on the irradiation side and an ohmic contact on the anode side and/or irradiation side. The irradiation and anode stop ring biasing configuration influences the leakage current flowing to the anode and, hence, the overall efficiency of the active area of the detector. A gettering process is also described for creation of the disclosed SDD detectors. The SDD detector may utilize a segmented configuration having multiple anode segments and kick electrodes for reduction of the detector's surface electric field. In another embodiment, a number of strip-like anodes are linked together to form an interdigitated SDD detector for use with neutron detection. Further described is a wraparound structure for use with Ge detectors to minimize capacitance.

21 Claims, 28 Drawing Sheets

OTHER PUBLICATIONS

Medipix Website; The Medipix Home Page; http://medipix.web.cern.ch/MEDIPIX/; Nov. 6, 2006; 7 pp.

PNSensor SDD Projects Website; Multi Channel Silicon Drift Detectors for Scintillator Readout (DRAGO); http://www.pnsensor.de/Welcome/Research/SDD_Projects/index.html; 4 pp, 2010.

Barkan, et al.; "VORTEX—A New High Performance Silicon Drift Detector for XRD and XRF Applications", JCPDS—International Centre for Diffraction Data; 2003; Advances in X-ray Analysis (vol. 46); pp. 332-337.

* cited by examiner

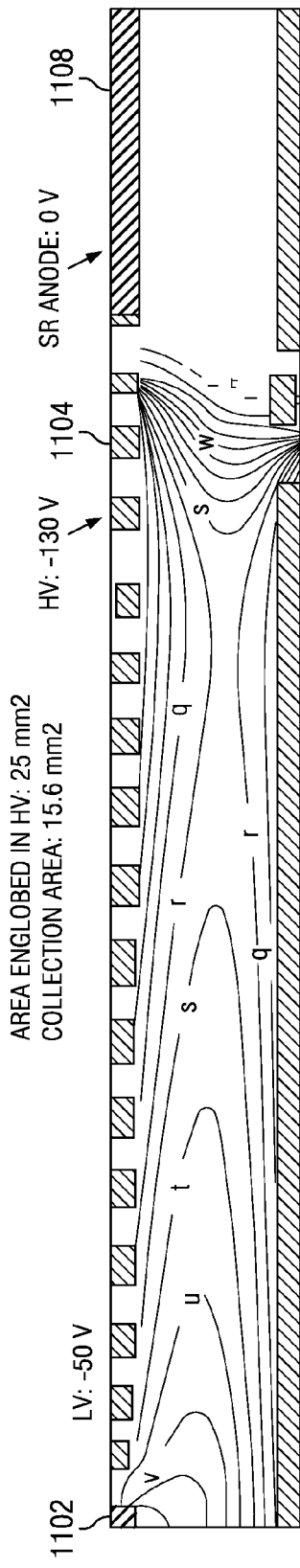
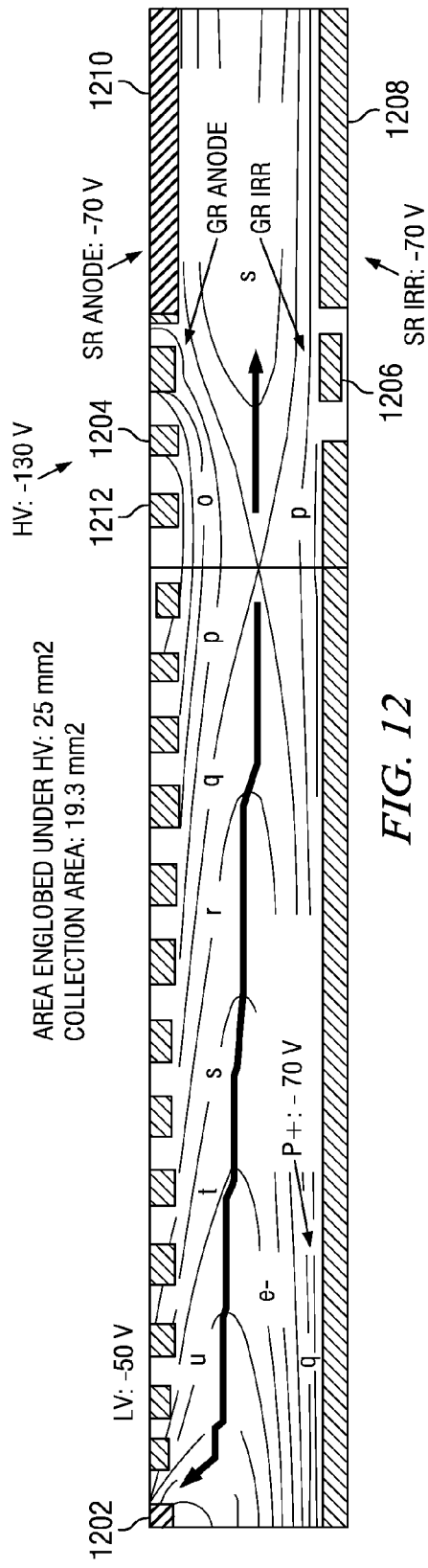
FIG. 11
FIG. 12

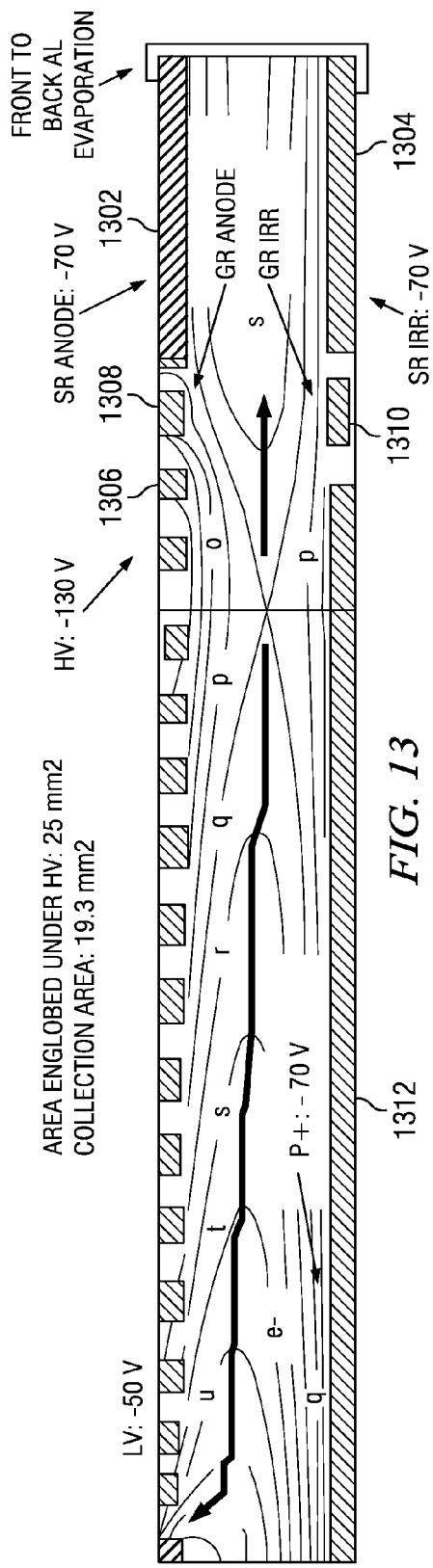
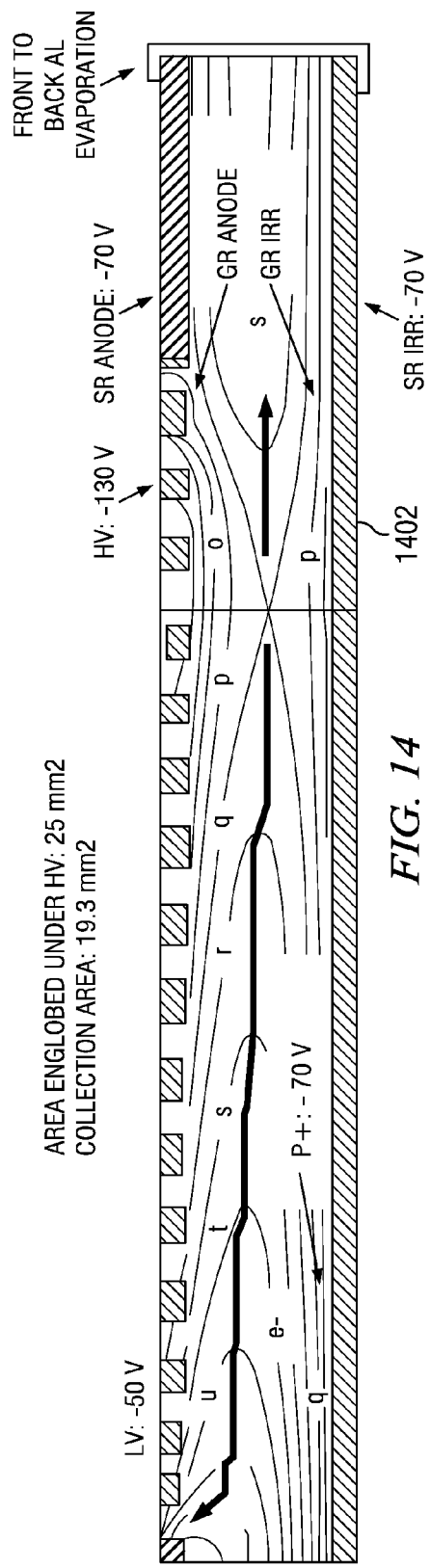
FIG. 13
FIG. 14

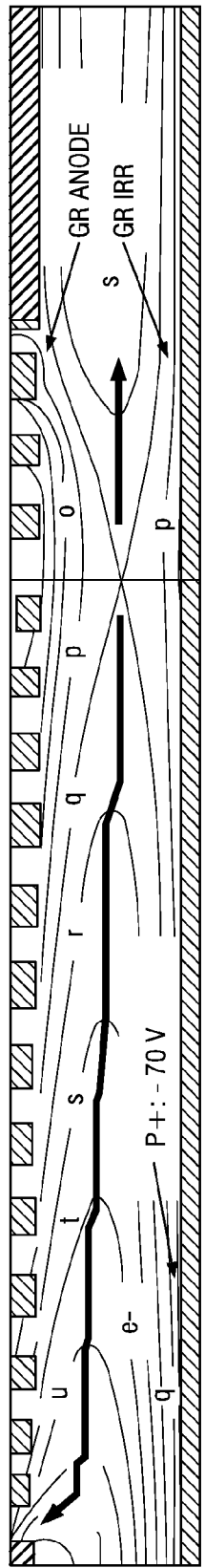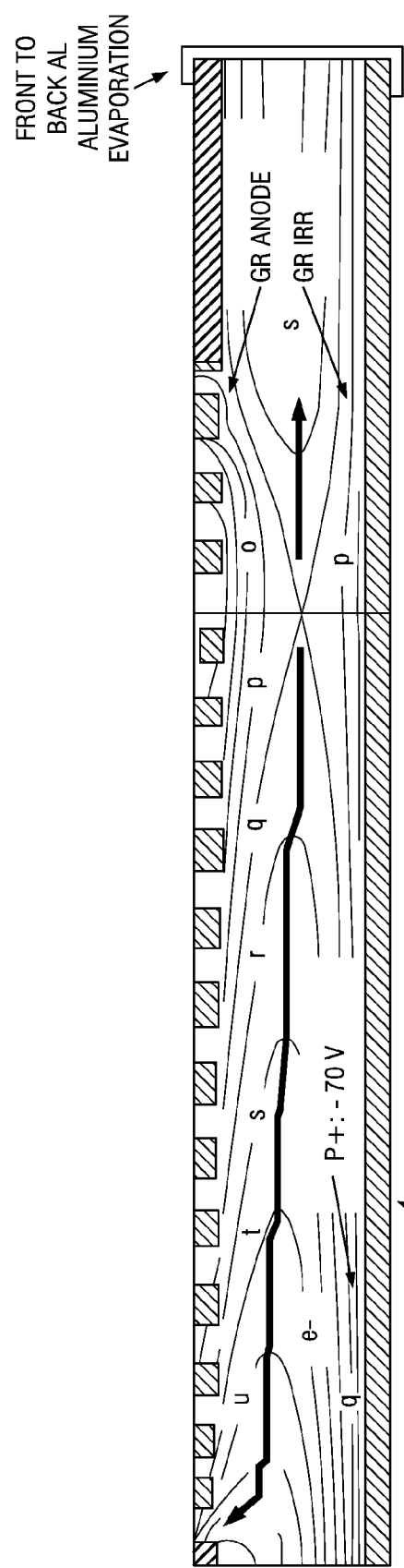

| tg (ms) | OPTIMAL INTERANODE DISTANCE FOR A MINIMAL nSHAPING TIME (mm) | AREA FOR A 4 cm LENGTH OF ANODE (mm2) | MINIMAL SHAPING TIME [μsec] | C DRIFT (pF) | C EQUIVALENT PIN DIODE (pF) |
|---|---|---|---|---|---|
| 1 | 0.25 | 10 | 0.038 | 5.28 | 3.51 |
| 2.5 | 0.34 | 13.6 | 0.05 | 5.28 | 4.78 |
| 5 | 0.43 | 17.2 | 0.06 | 5.28 | 6.04 |
| 10 | 0.54 | 21.6 | 0.08 | 5.28 | 7.59 |
| 20 | 0.68 | 27.2 | 0.1 | 5.28 | 9.55 |
| 40 | 0.87 | 34.8 | 0.13 | 5.28 | 12.22 |

*FIG. 37*

| tg (ms) | OPTIMAL INTERANODE DISTANCE FOR A MINIMAL nSHAPING TIME (mm) | RMS FOR MIN OF TSHAP | RMS FOR 2* MIN OF TSHAP | RMS FOR 4* MIN OF TSHAP | RMS FOR 8* MIN OF TSHAP | RMS FOR 16* MIN OF TSHAP |
|---|---|---|---|---|---|---|
| 1 | 0.25 | 215 | 155 | 120 | 109 | 124 |
| 2.5 | 0.34 | 191 | 133 | 103 | 94 | 106 |
| 5 | 0.43 | 164 | 119 | 92 | 83 | 95 |
| 10 | 0.54 | 146 | 106 | 82 | 74 | 84 |
| 20 | 0.68 | 130 | 94 | 73 | 66 | 75 |
| 40 | 0.87 | 116 | 84 | 65 | 59 | 67 |

*FIG. 38*

| tg (ms) | OPTIMAL INTERANODE DISTANCE FOR A MINIMAL nSHAPING TIME (mm) | ΔE/E (662 keV) FOR MIN OF TSHAP | ΔE/E (662 keV) FOR 2* MIN OF TSHAP | ΔE/E (662 keV) FOR 4* MIN OF TSHAP | ΔE/E (662 keV) FOR 8* MIN OF TSHAP | ΔE/E (662 keV) FOR 16* MIN OF TSHAP |
|---|---|---|---|---|---|---|
| 1 | 0.25 | 2.88 | 2.66 | 2.56 | 2.53 | 2.57 |
| 2.5 | 0.34 | 2.79 | 2.60 | 2.52 | 2.50 | 2.53 |
| 5 | 0.43 | 2.69 | 2.56 | 2.50 | 2.48 | 2.50 |
| 10 | 0.54 | 2.63 | 2.53 | 2.48 | 2.46 | 2.48 |
| 20 | 0.68 | 2.59 | 2.50 | 2.46 | 2.45 | 2.46 |
| 40 | 0.87 | 2.55 | 2.48 | 2.45 | 2.44 | 2.45 |

*FIG. 39*

SIMPLIFIED SILICON DRIFT DETECTOR AND WRAPAROUND NEUTRON DETECTOR

CROSS-REFERENCE TO RELATED APPLICATIONS

This application claims the benefit of provisional Application No. 61/226,185, filed Jul. 16, 2009.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to radiation detection, and, more specifically, to the detection of ionizing radiation using large area silicon solid state detectors.

2. Description of Related Art including information disclosed under 37 CFR 1.97 and 1.98

Silicon Drift Detectors (SDD) having concentric drift electrodes around an anode on the counter irradiation side and a continuous p+ junction on the irradiation side are known in the art. FIG. 1 depicts such a traditional SDD having such circular anode. The benefit of a small anode is that it reduces the detector capacitance. This lower capacitance reduces the series-noise component and thus reduces the overall inherent electronic noise of the device. Thus, because of their low capacitance, such SDDs have been known to have superior noise features when compared to pin diodes. However, very large area SDDs (i.e., >100 mm$^2$) face other significant limitations.

One such limitation is the ballistic deficit. The ballistic deficit causes free electrons generated from the radiation absorption within the material to repel each other as they drift towards the anode. This repulsion results in a pronounced spread between the drifting electrons. This spread does not allow all electrons to reach the anode at the same time. Consequently, larger shaping times must be utilized by the detection circuitry which further limits the practical size of the SDDs. A larger shaping time also reduces count rate performance due to the influence of leakage current.

To improve count rate performance, others have developed very small area pin pixel devices that couple each pixel to an electronic channel. However, this approach requires the use of specialized interconnects and flip chip techniques and does not meet the required resolution for many radiation detection applications.

BRIEF SUMMARY OF THE INVENTION

The present invention includes various embodiments of large area SDD detectors. In one embodiment, the detector features linear anodes and oblong-shaped steering electrodes surrounding the linear anodes. This embodiment is useful for applications requiring direct detection of ionizing radiations such as alphas, betas, and X-rays. The dimensions of these linear anode devices possess aspect ratio of L/W dimensions higher then 2, provides shorter drift distances then with circular devices having the same active area and therefore reduces ballistic deficit.

Another embodiment includes a central anode SDD drift detector (such as oblong, circular, hexagonal or rectangular drift detectors shapes) utilizing a biasing configuration wherein the irradiation and anode stop rings (edge electrodes) are set at the same reverse bias. This embodiment comprises an additional ring between p+ electrode and the irradiation side stop ring and/or an additional ring between the HV steering electrode and the anode side stop ring, in order to prevent injection current from the edge to the active area.

The embodiment may also comprise a continuous P+ junction on the irradiation side. The bias of this continuous junction in such a configuration is the same as the bias of anode side stop ring. The continuous junction and anode side stop ring can be linked together in order to reduce the resistance between them.

In another embodiment the SDD linear anode drift detector comprises a periodic array of rectangular anodes (which can be monolithic or separate devices). This configuration is useful for applications where the detectors are coupled to scintillators. The scintillators can then either convert gammas to visual photons (e.g., CsI, LaBr, and NaI) or neutrons to visual photons (LiF). The advantage of this approach is that for a given area, if the L/W ratio is large enough, the drift length of electrons will be smaller than for a circular drift detector, enabling the use if lower shaping times.

In yet another embodiment, the SDD is separated by an independent kick electrode that is independently biased from the concentric electrodes network. This electrode itself has an elongated rectangular shape and is made from a series of small rectangular junction's separated by implanted resistors so that the bias of these rings can be varied in a linear way from border to center. Using the appropriate rectangular aspect ratio and the appropriate size of rectangle, several anodes can be connected together on an interposer ceramic or semiconductor.

The present invention also includes an embodiment of an inter-digitized SDD comprising simplified electrodes structures surrounding the anode (one depletion electrode next to the anode replacing a multiple of steering electrodes). This configuration is useful for either neutron detection applications with B10 or Li7 converters or for scintillation applications.

The present invention also includes a low capacitance detector for neutron detection wherein the p+ electrode surrounding the anode is implemented in a wrap around geometry. The advantage of such a wrap around geometry is that the electron drift time is smaller than for a simple planar interdigitated simplified SDD detector. An additional advantage is that they are compatible with texturing.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein:

FIG. 11 is a depiction of a cross section of a normal configuration where the stop ring is set to ground;

FIG. 12 is a depiction of a cross section of a biasing configuration where the top and bottom stop rings are set at the same reverse bias which is equal to the bias of the irradiation junction;

FIG. 13 is a cross section depicting how a front to back Al evaporation binds the SR anode electrode and the SR in anode;

FIG. 14 is a cross section depicting the use of a continuous p+ electrode on the irradiation side;

FIG. 17 is a depiction of the cross section after the boron junction is implanted and annealed;

FIG. 18 is a cross section after the front to back evaporation is completed;

FIG. 37 is a table representing the optimal inter-anode spacing and capacitance for different generation lifetimes;

FIG. 38 is a table representing the rms noise for various shaping times; and

FIG. 39 is a table representing the rms noise as translated into an energy resolution.

Figure 1:
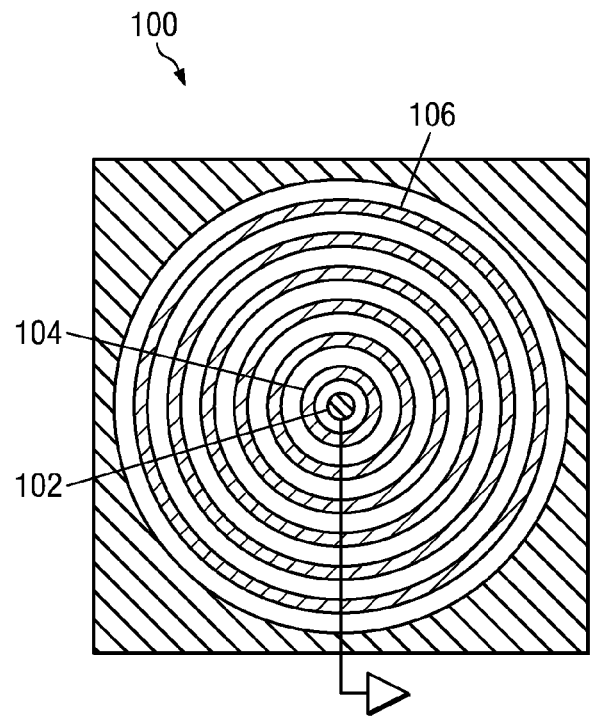
FIG. 1 is a depiction of the cross section of a traditional SDD having a small circular central anode.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

DETAILED DESCRIPTION OF THE INVENTION

FIG. 1 depicts a traditional SDD (100) having a small circular anode (102) at its center. By keeping the center anode (102) smaller relative to the overall area of the detector, capacitance of the detector can be minimized. This minimization reduces the series-noise component and thus reduces (i.e., improves) the overall inherent electronic noise of the device. This central anode (102) is then linked to the radiation detection circuitry. A low voltage bias is applied to the inner drift rings (104) with the highest reverse bias is applied to the outer rings (106).

Linear Drift Detector with Linear Anodes

Another way to reduce the capacitance of SDD detectors is to make drift detector with thin rectangular anodes where the drift structures are linear. Although the capacitance of such detectors tends to be larger than that of a circular SDD, this new anode geometry provides other advantages that more than offset the increased noise. Such a detector is depicted in FIG. 2.

Figure 2:
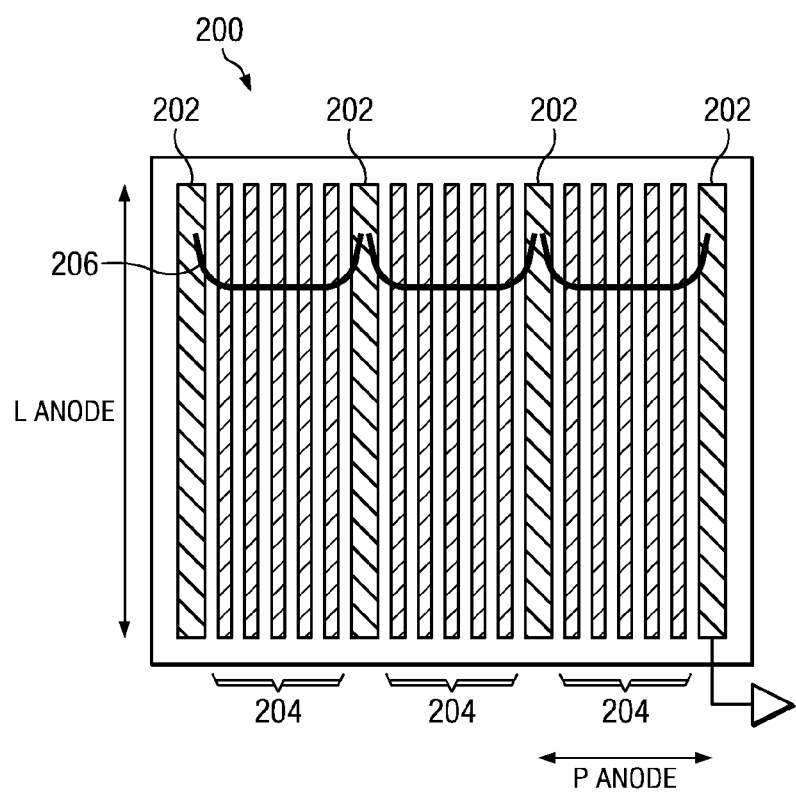
FIG. 2 is a depiction of an embodiment of the a strip anode detector, which is an SDD having a series of thin rectangular anodes arranged in a linear fashion.

As shown in FIG. 2, this rectangular embodiment of the SDD detector (200) utilizes a periodic set of anodes (202)

separated by several parallel p+ electrodes (204). The anodes (202) and electrodes (204) are rectangular in shape and repeat in a pattern across the face of the material. In operation, a relatively high reverse bias is applied to the p+ electrodes (204). Bonding or interconnect wires (206) connect the anodes in a parallel fashion. One anode is then linked to external detector electronic circuitry.

Figure 3:
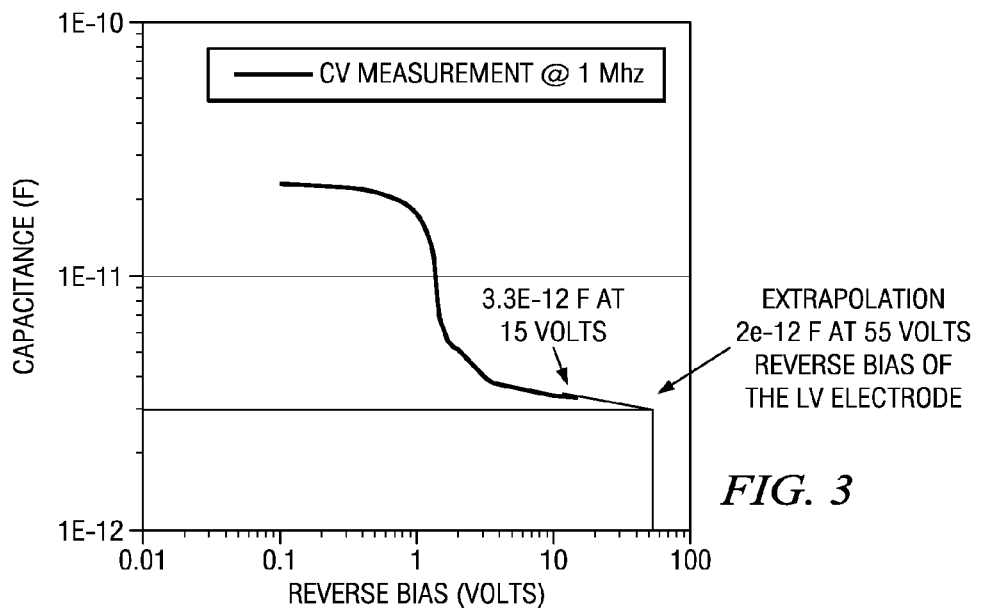
FIG. 3 is a graph displaying the capacitance of a linear anode with respect to its reverse bias voltage for a 0.8 cm long anode.

The lineic capacitance of these detectors is readily determinable. FIG. 3 depicts a graph of the capacitance with respect to the reverse bias of the electrodes. As shown by the graph, this capacitance can reach values as low as approximately 2 pF/cm per unit length of a lineic anode when a reverse bias of −55V is applied to the closest steering cathode to the anode (which is dominant for the computation of the anode capacitance). The typical range lineic capacitance can be between 1 pF/cm and 2.5 pF/cm. However, the exact range is dependent upon design and processing conditions of the semiconductor materials, and typically differs from the anode voltage by at least 30V absolute.

The energy resolution of this embodiment of detector when coupled to a scintillator device is represented by the following equation (Math 1):

$$\frac{\Delta E}{E} = 2.355 * \frac{1}{\sqrt{\frac{1}{Nph^2 \ldots n_{qe}^2} \cdot ENC_{[rms]}^2 + \frac{1}{n_{qe} \cdot Nph} + \frac{1}{2.355^2} \cdot \left(\frac{\Delta E}{E}\right)_{intrinsic}^2}} \quad \text{Math 1}$$

In this equation Nph is the number of photons generated by the absorption of the ionizing radiation and ENC is the electronics noise.

The components of the electronics noise in this embodiment may also be modeled. This component is further divided into a parallel component and a series component. The expression of the parallel component is represented by the following equation (Math 2):

$$ENC_{parallel} = \frac{1}{q} \cdot \sqrt{\frac{A_3}{2}(2 \cdot q \cdot I_{leak}) \cdot t_{shaping}} \quad \text{Math 2}$$

In this equation $I_{leak}$ is the leakage current of the detector. The expression of the series component is represented by the following equation (Math 3):

$$ENC_{series} = \frac{1}{q} \cdot C_T \sqrt{\frac{A_1}{2}\left(\cdot 4 \cdot k_B \cdot T\left(\frac{\gamma}{g_m} + R_c\right)\right) \cdot \frac{1}{t_{shaping}}} \quad \text{Math 3}$$

In this equation $g_m$ is the transconductance of the input FET.

The expression of the leakage current in the present embodiment as a function of the generation lifetime τ and the substrate thickness is represented by the following equation (Math 4):

$$I_{leak} = \cdot q \cdot \frac{ni \cdot w}{2 \cdot \tau} \cdot (L_{anode} \cdot p_{anode}) \quad \text{Math 4}$$

In this equation $L_{anode}$ is the lineic anode length and $P_{anode}$ is the inter anode distance. Thus, the total electrical noise in the present embodiment may be represented by the following equation (Math 5):

$$ENC^2 = \left(\frac{1}{q}\right)^2 \cdot \left(\frac{A_3}{2}\left(2 \cdot q^2 \cdot \frac{ni \cdot w}{2 \cdot \tau} \cdot (L_{anode} \cdot p_{anode})\right) \cdot t_{shaping} + \frac{A_1}{2}(C_{lineic} \cdot L_{anode})^2 \left(4 \cdot k_B \cdot T\left(\frac{\gamma}{g_m} + R_c\right)\right) \cdot \frac{1}{t_{shaping}}\right) \quad \text{Math 5}$$

The minimal shaping time that must be used is equal to the maximal drift time which is expressed by the following equation (Math 6):

$$t_{shaping} = \frac{d_{driftmax}}{v_{drift}} = \frac{p_{anode}}{2} \frac{1}{\mu \cdot E}. \quad \text{Math 6}$$

In this equation $d_{drift\,max}$ is the maximal drift distance that will be traveled by an electron going towards the anode and E is the typical drift field used in an SDD. The drift field (E) typically ranges from 200 V/cm to 500 V/cm.

The shaping time and the electrical noise equations can thus be combined to yield the following equation (Math 7):

$$ENC^2 = \left(\frac{1}{q}\right)^2 \left(\frac{A_3}{2}\left(2 \cdot q^2 \cdot \frac{ni \cdot w}{2 \cdot \tau} \cdot (L_{anode} \cdot p_{anode})\right) \cdot \frac{p_{anode}}{2} \frac{1}{\mu \cdot E} + \frac{A_1}{2} \cdot (C_{lineic} \cdot L_{anode})^2 \left(4 \cdot k_B \cdot T\left(\frac{\gamma}{g_m} + R_c\right)\right) \cdot \frac{2 \cdot \mu \cdot E}{p_{anode}}.\right) \quad \text{Math 7}$$

The inter-anode distance $p_{anode}$ that will lead to an optimal resolution for the minimal shaping time may be obtained from the derivative of $ENC^2$ (Math 8).

$$\frac{\partial ENC^2}{\partial p_{anode}} = 0 \quad \text{Math 8}$$

The optimal inter-anode distance is thus provided by the following equation (Math 9):

$$p_{anode} = \sqrt[3]{\frac{A_1 \cdot C_{lineic}^2 \cdot L_{anode} \cdot \left(4 \cdot k_B \cdot T\left(\frac{\gamma}{g_m} + R_c\right)\right) \cdot 2 \cdot (\mu \cdot E)^2}{A_3\left(2 \cdot q^2 \cdot \frac{ni \cdot w}{2 \cdot \tau} \cdot\right)}} \quad \text{Math 9}$$

FIG. 37 provides a table showing the optimal inter-anode spacing for different generation lifetimes. The capacitance of the drift elementary cell is listed (5th column) in addition to the equivalent capacity of a 300 μm thick pin detector (6th column). The linear anode SDD configuration becomes useful when the capacity of the drift detector is smaller than the pin detector. Beyond this point, the generation lifetime is superior to 2.5 ms.

FIG. 38 provides a table depicting the rms noise for shaping times equal to the minimal acceptable value, as well as multiples of 2, 4, 8, and 16 times this value. These rms noise values may then be translated into an energy resolution (percentage) as shown in the table in FIG. 39. From the tables, it can be seen that approximately 8 times the minimal shaping time (column 6) is optimal.

Linear Drift Detector Having Linear Anodes and Common Bus-Bar Interconnections

Figure 4:
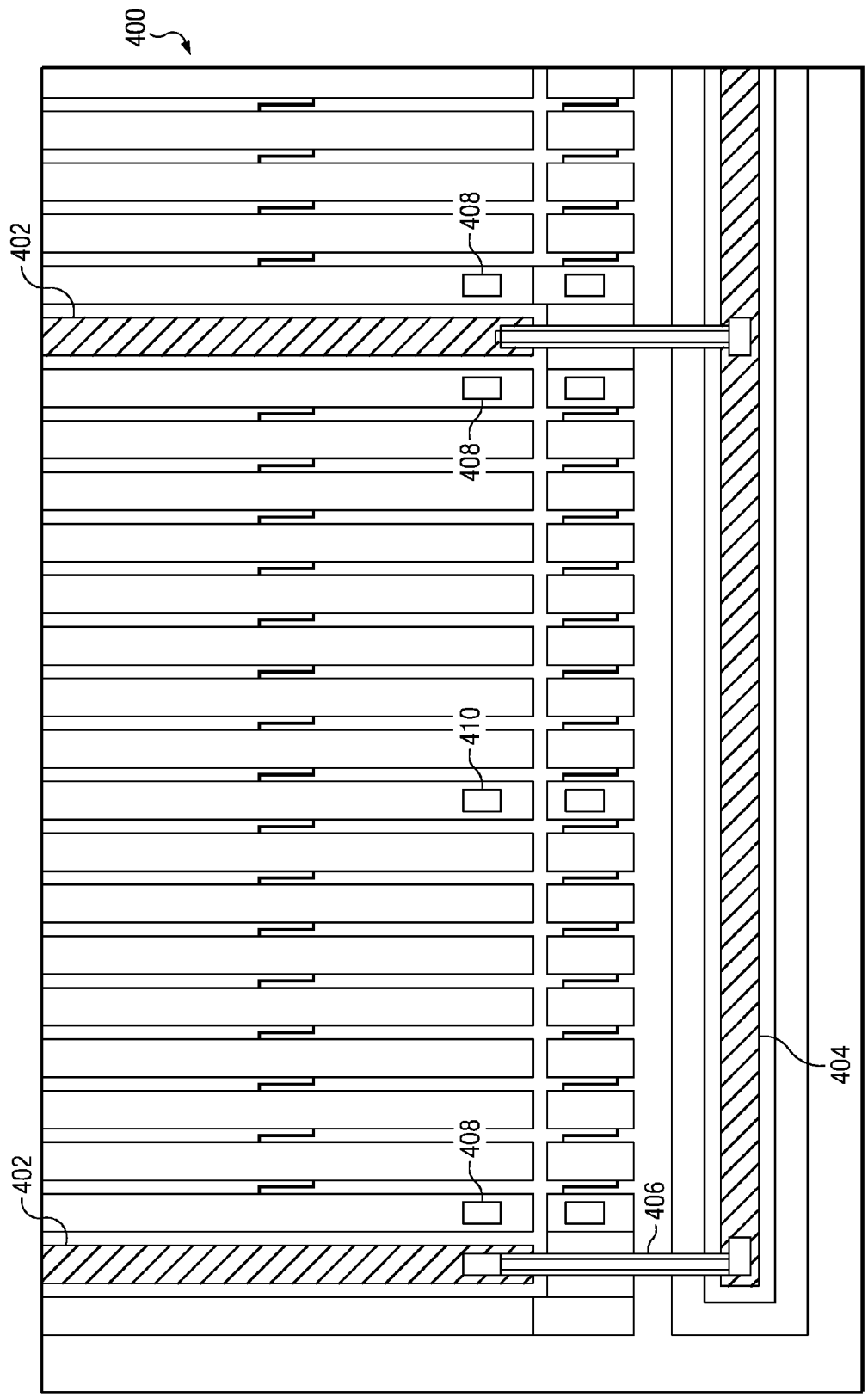
FIG. 4 is a depiction of an embodiment of a strip anode detector having a common bus-bar.

FIG. 4 depicts another embodiment. In this embodiment, the anodes (402) of the rectangular SDD (400) may be bonded or linked to a "common bus-bar anode" (404) as shown. A bonding wire (406) is attached to the anode (402) and the bus-bar (404). Bias voltage is applied through the low voltage bonding pads (408) and high voltage bonding pads (410). This common bus-bar may then be connected to the peripheral electronic circuitry.

Figure 6:
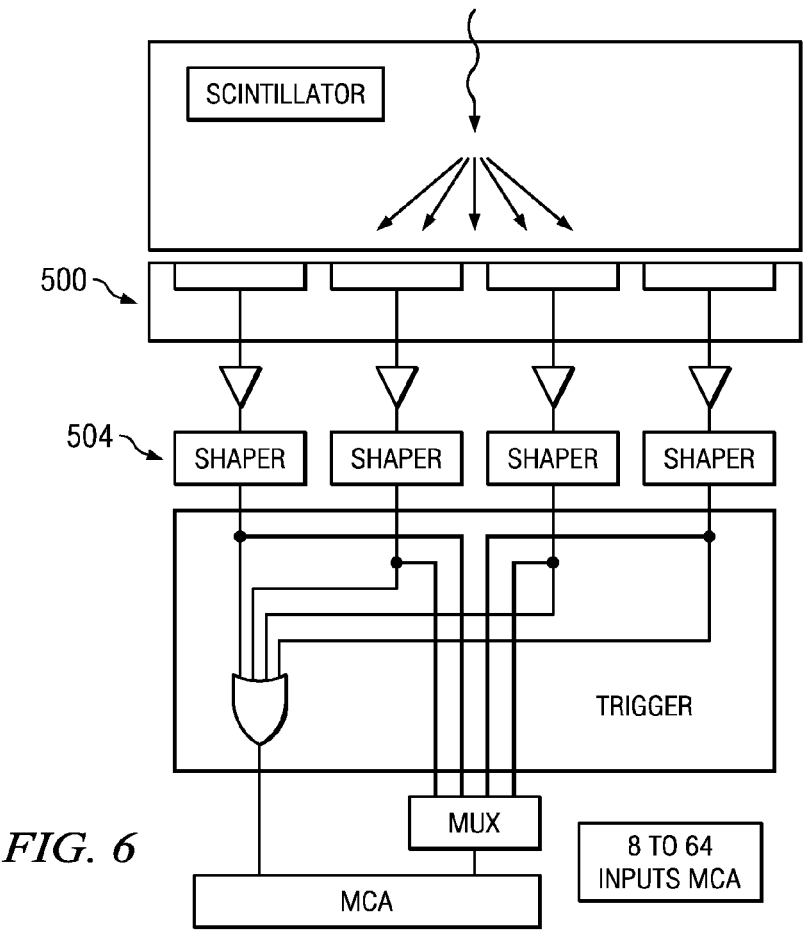
FIG. 6 is a diagram representing how the trigger associates events that have been recorded on channels in a defined time frame in order to create time-stamped events coming from different channels to use when performing image reconstruction.
Figure 5:
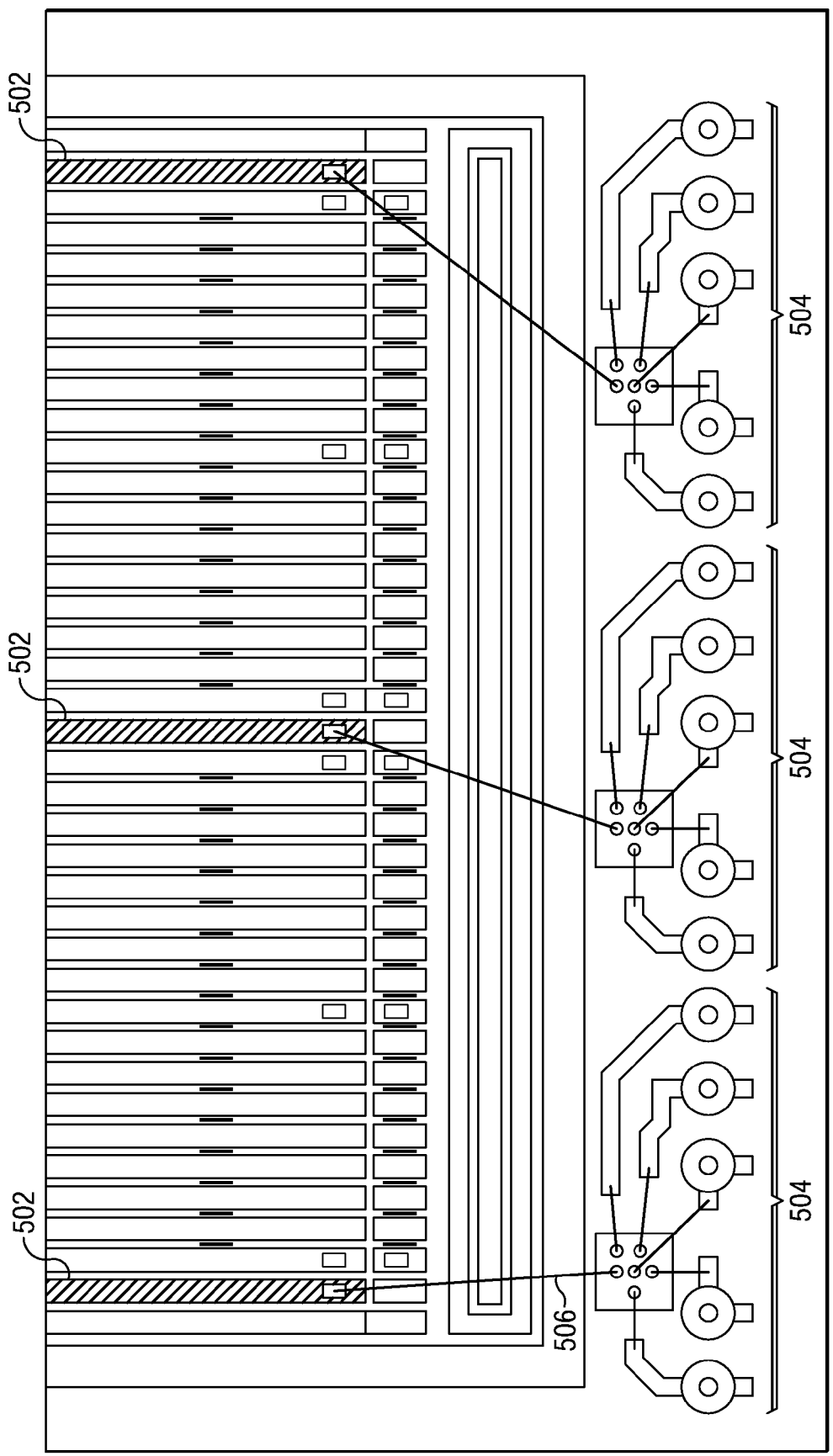
FIG. 5 is a depiction of every strip anode as connected to a single electronics channel.

FIG. 5 depicts another embodiment. In this embodiment, the "common bus-bar anode" configuration (400) may be ignored and each anode (502) can be connected (506) to a single electronics channel (504) as shown. This array of linear SDDs (500) can be used for performing one-dimensional particle localization by weighting the responses from all the ASICS as shown on FIG. 6. A 2D retracing can be done by using additional localization information from the resistive anodes and collecting FETs at the end of each anode (504): the weighting given on each FET will give the Y localization information in the Y direction.

Oblong-Shaped SDD Detector Having Linear Anodes and Steering Electrodes

Figure 7:
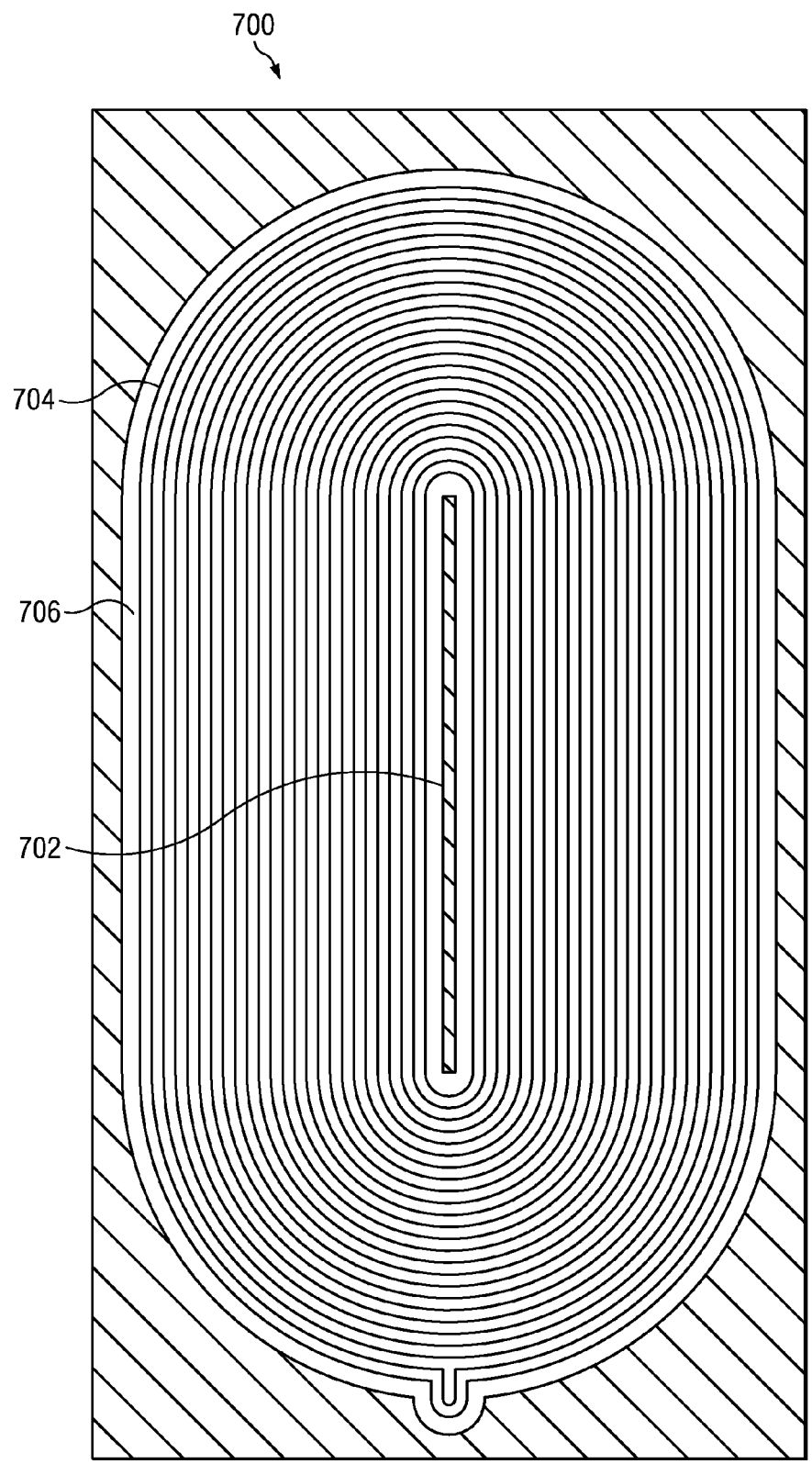
FIG. 7 is a depiction of an embodiment of an SDD detector with linear anodes and steering electrodes having an oblong shape.

Another embodiment, depicted in FIG. 7, is an SDD detector with a linear anodes and steering electrodes having an oblong shape. The oblong shaped device (700) has a central anode (702) with regard to the active area as shown. The highest steering electrode (704) is located close to the edge, which causes the drift field to project inward toward the central anode (702). This configuration requires an external ohmic region or junctions called stop rings that are broad enough to prevent the flow of injection current towards the active area. This configuration also requires spacing (706) in between the edge and the highest steering electrode sufficiently large to avoid breakdown.

One of the benefits of an oblong shape is that it provides a shorter drift distance than with circular devices having the same active area. This shortened drift distance reduces the ballistic deficit. The oblong shape also guarantees a better voltage potential grading to the edge then a rectangular shaped device. Also, in this embodiment the distance between the end of the linear anode and the stop rings is consistent at all points. However, this is not the case with the rectangular devices.

Figure 8:
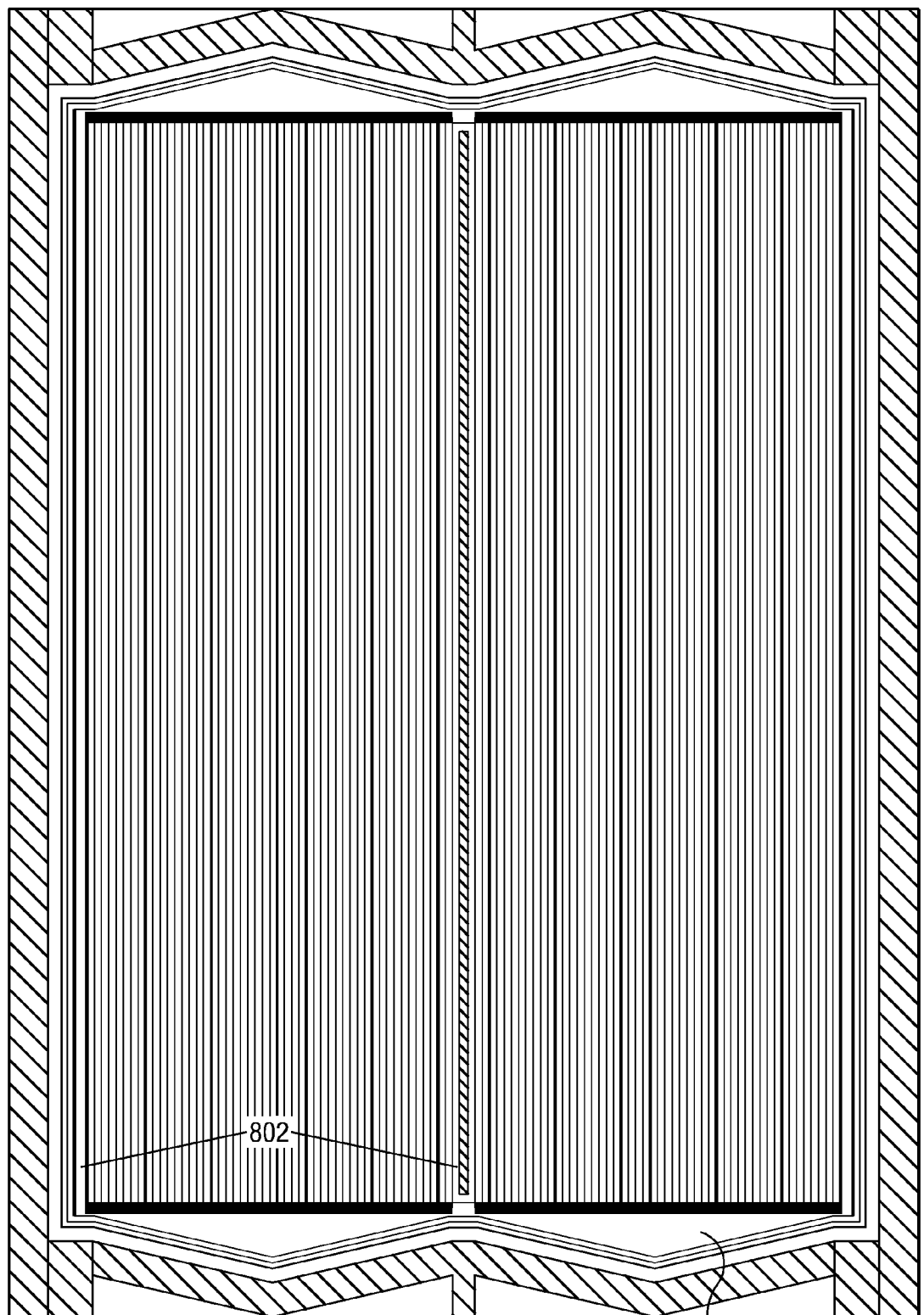
FIG. 8 is a depiction of an embodiment of an SDD detector having linear anodes and triangular guard rings.

The part of the oblong detector having a concentric drift field can be collimated so that a segmentation of these structures can be coupled to rectangular scintillators. Such a detector configuration is shown in FIG. 8.

Figure 9:
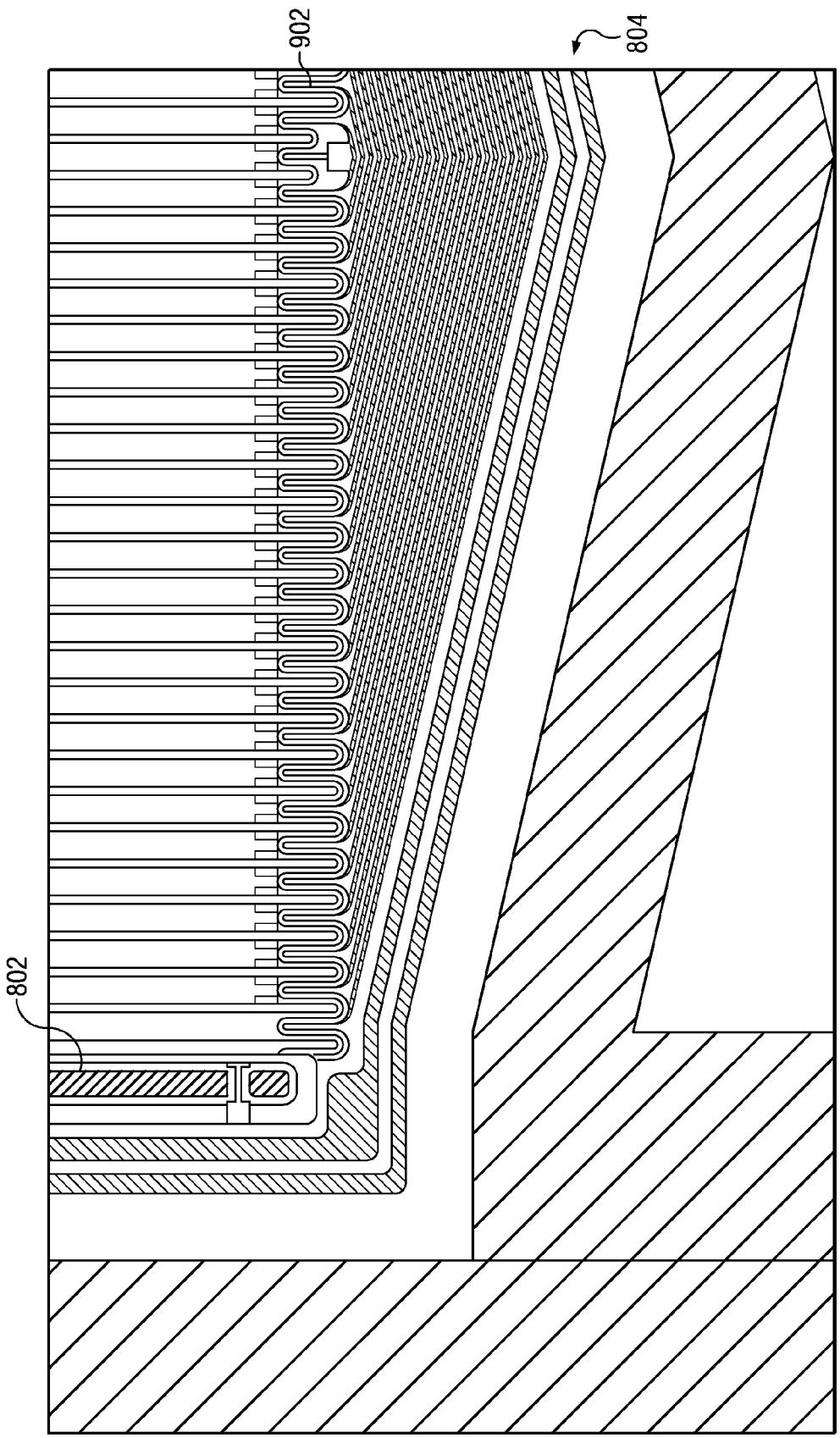
FIG. 9 is a depiction of a close-up view of the triangular guard rings from the previous figure.
Figure 10:
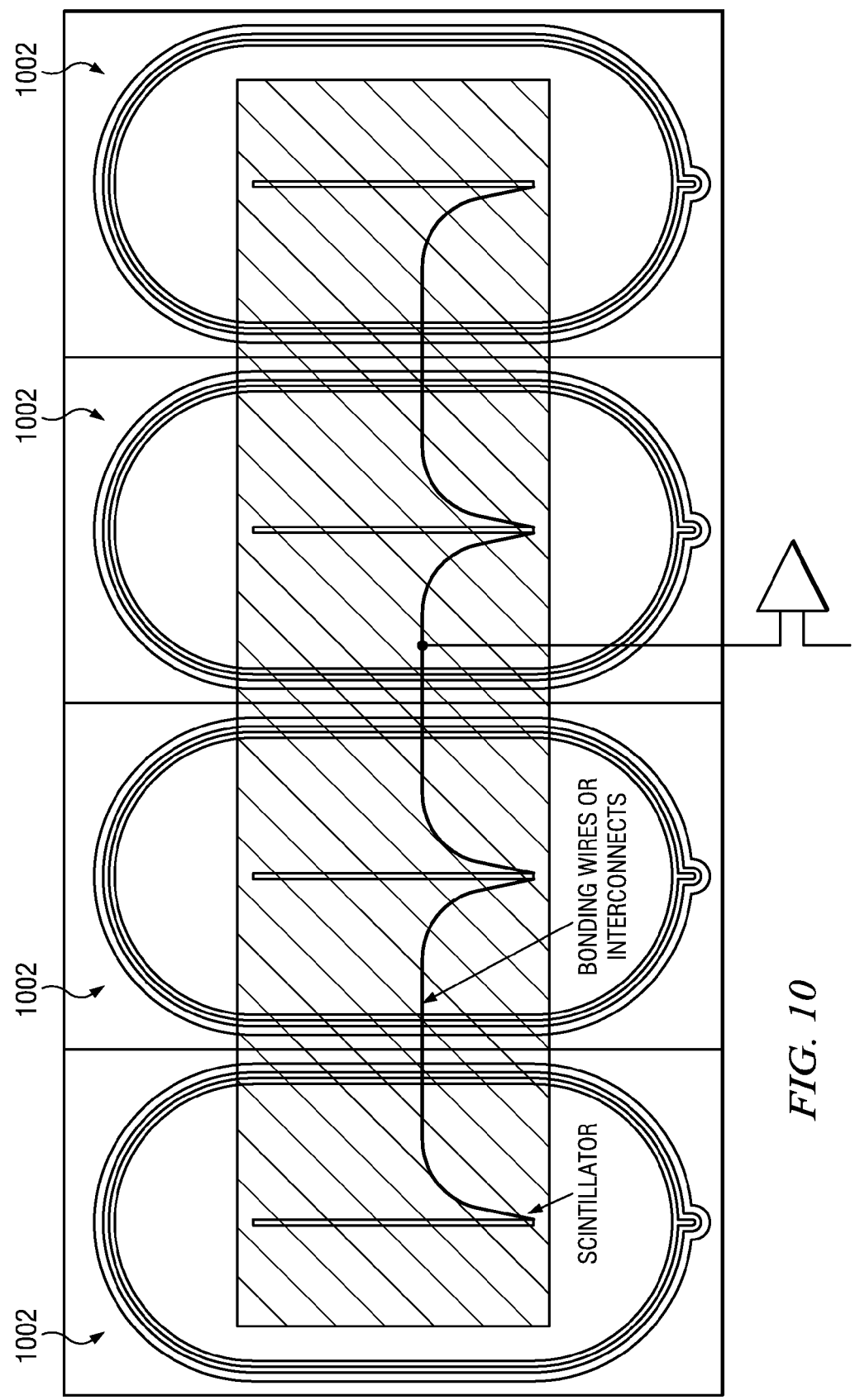
FIG. 10 is a depiction of a cross section of an embodiment of the present invention featuring a periodic array of oblong shaped SDDs.

In this embodiment the SDD comprises linear anodes (802) and guard rings that occupy triangular areas at the higher and lower sides of the SDD. One such triangular edge is depicted in greater detail in FIG. 9, with the guard rings (902) made more visible. For manufacturability, a periodic array of these oblong structures can be reproduced and positioned under a scintillator device such as that shown in FIG. 10. The scintillator in this configuration is connected to the P+-side (opposite anode side) of the array.

In this embodiment, the border electrodes, called stop rings (1002), are generally set to ground both on both the anode side and on the irradiation side. They can function as either an ohmic contact or a junction.

FIG. 11 shows a cross section of this embodiment of oblong detector from the middle of an anode (1102) to the border electrode (1104). This cross section is also valid for a circular SDD detector. The simulations shown below are valid for a 25 mm2 SDD circular detector, but can also be applied to an oblong detector.

In this figure, it is shown that a significant part of the active area is lost (approximately 40%) when electrons generated at the right of the saddle point migrate towards the stop ring (1106). Several solutions have been thought to shift the saddle point to the right. Varying the biasing of the irradiation side stop ring to see the influence of the shift of the saddle point is a logical idea. However, putting the stop ring (1106) on the irradiation side at a reverse bias, while keeping the ohmic stop ring (1108) to ground on the anode side, induces a large current flow from the diced border to the p+ stop ring (1106) set in reverse bias.

Placing the stop ring on the anode side and the stop ring on irradiation side stop ring at the same reverse biases prevents any current flowing between them. This presents an alternative to the traditional grounding of stop rings. FIG. 12 illustrates an embodiment of the detector having a resistivity of between 3000 and 10000 ohms/cm on a substrate thicknesses ranging from 300 µm to 500 µm using this novel biasing of the SR in and SR anode being both set in reverse bias. Dimensions given on this graph are in cm.

In this graph (FIG. 12) the stop ring (border electrode) surrounding the p+ junction is labeled SR irr (since it is located on the irradiation side) (1208). The stop ring (border electrode) surrounding the HV junction is named SR anode (since it is located on the anode side) (1210). The Guard rings between the p+ stop ring (SR irr) and the p+ junction is labeled GR IRR (1206). The Guard ring between the HV electrode and between the anode stop ring is labeled GR anode (1204).

The GR in (1206) can be set to a higher reverse bias than the p+ junction and the SR in (1208) if a complete blocking of the current flow from the border region to the anode region is desired. These guard rings (1206) are typically set to the same bias as the largest bias of the steering electrodes. For example, the largest bias utilized is −130 Volts. This large bias helps to minimize the leakage current going towards the anode.

To simplify the assembly of the SDD detector, a lateral evaporation can be performed between the front and back side of the semiconductor material. This sets the SR in (1304) and SR anode (1302) electrodes to the same bias as shown on FIG. 13. From this figure, if an area enclosed within the HV ring (1306) (highest steering electrode potential) is 25 mm$^2$, a useful active area of 19 mm$^2$ can still be obtained.

If the reverse bias applied to both stop rings (1302 and 1304) is the same as the p+ junction (1312), and if the GR IRR (1310) and GR anode (1308) biases are also being set to the same bias as the p+ junction (1312), there is present a continuous potential along the irradiation side. This makes possible the implementation of a single sided SDD device technology.

FIG. 14 depicts yet another embodiment in which a continuous p+ electrode (1402) is used on the irradiation side. In this embodiment, the current reaching the anode is often slightly higher than in the case where a guard ring exists between the SR in (1304) and the p+ junction (1312). Although the collimation area might be somewhat smaller, this process is advantageous on an industrial basis since it can make the best use of single sided technology. Such a process can make use of a very efficient and economical gettering process.

The gettering process involves the following steps: (a) implementation of all electrodes on the anode side; (b) phosphorous doping (such as implantation, POCL3 diffusion, etc.) on the irradiation side; (c) annealing at temperature between 850° C. and 950° C. for periods ranging from 10 minutes to 10 hours; (d) reactive ion etching (RIE) with HBr or other compounds of the phosphorous layer; (e) Low-pressure chemical vapor deposition (LPCVD) SiO2 deposition or E-beam SiO2 deposition; (f) doping of a thin junction (boron or Ga); (g) activation and annealing; (g)(i) annealing activation between 700° C. and 900° C. for periods ranging from 5 minutes to several hours in a furnace; (g)(ii) Excimer laser annealing for energy densities of 0.8 J/cm2; and (h) oxide etching on the irradiation side.

Figure 15:
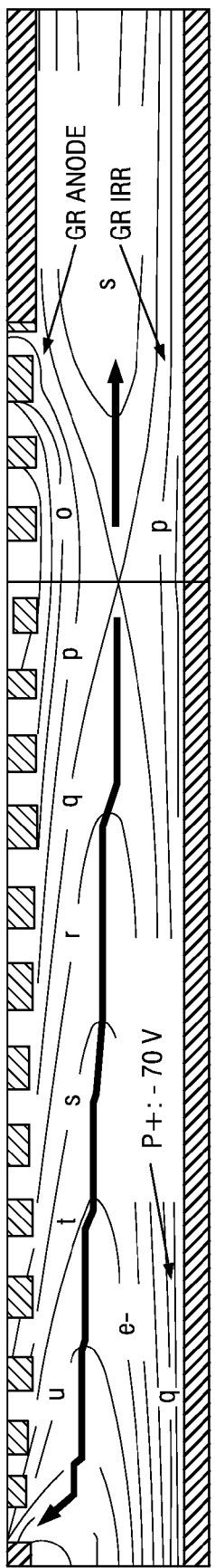
FIG. 15 is a depiction of a cross section with gettering layer prior to RIE etching.
Figure 16:
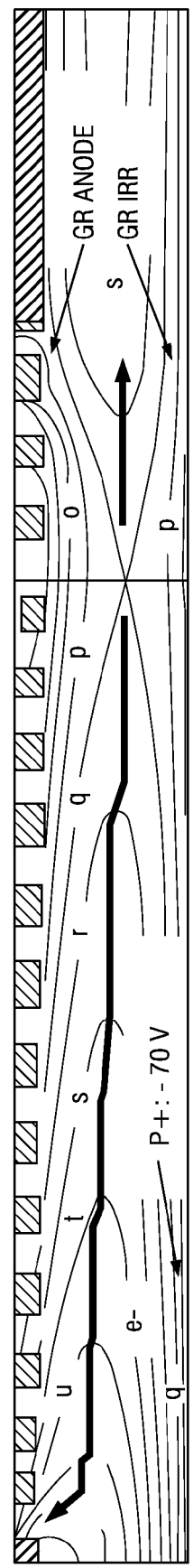
FIG. 16 is a depiction of a cross section after RIE etching.

The cross section of the detector with the gettering layer (phosphorous doped) prior to the RIE etching is shown in FIG. 15. Once RIE etching is performed, the cross section is as shown in FIG. 16. Following etching, the boron junction is then implanted and annealed, resulting in a cross section as depicted in FIG. 17. Afterwards, the front to back evaporation is performed. A cross section of the complete device following this process step is shown in FIG. 18.

Figure 19:
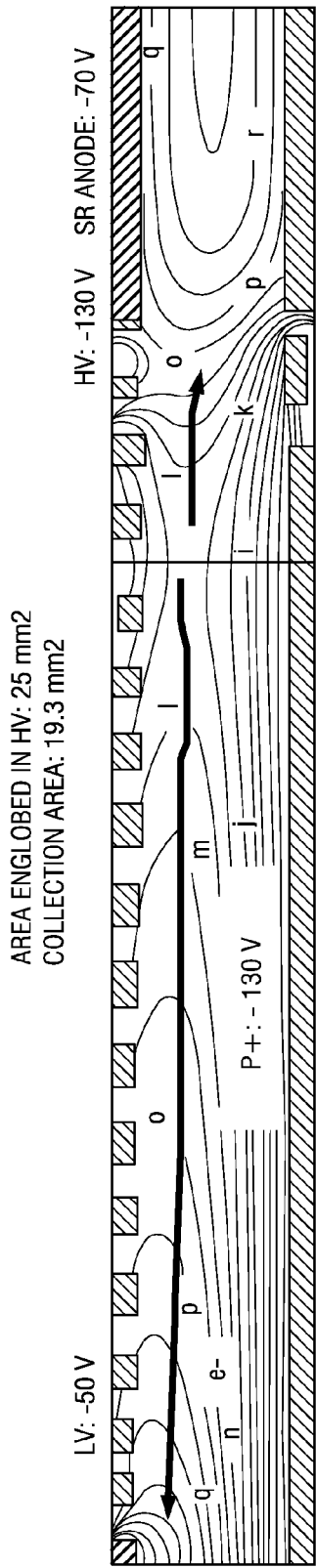
FIG. 19 is a cross section depicting a biasing configuration where the top and bottom stop rings are set at the same reverse bias which are not equal to the bias of the irradiation junction.

Other biasing configurations are also available. In another embodiment, the HV bias can be equal to the P+ bias, while the stop rings can be set to about half the value of the HV=P+ bias. An additional guard ring around the p+ junction can be set to a value equal or greater to the P+ bias. Using values greater than the P+ bias again protects the anode against border injection currents. A cross section of such a configuration is depicted in FIG. 19. In this figure, the LV=−50 V, HV=−130V, P+(irradiation side)=−130 V, the SR anode side voltage=−70 V, and the SR irradiation side voltage=−70 V. These configurations have larger useful areas than the traditional configuration where the stop rings of each side are set to ground.

At present, large area alpha-beta detectors have circular shapes (CAM 450 mm2 and alpha CAM 2000 mm2 detectors). Yet, arrays of elongated SDDs with linear anodes may be stacked next to each other and constitute a square shape.

Figure 20:
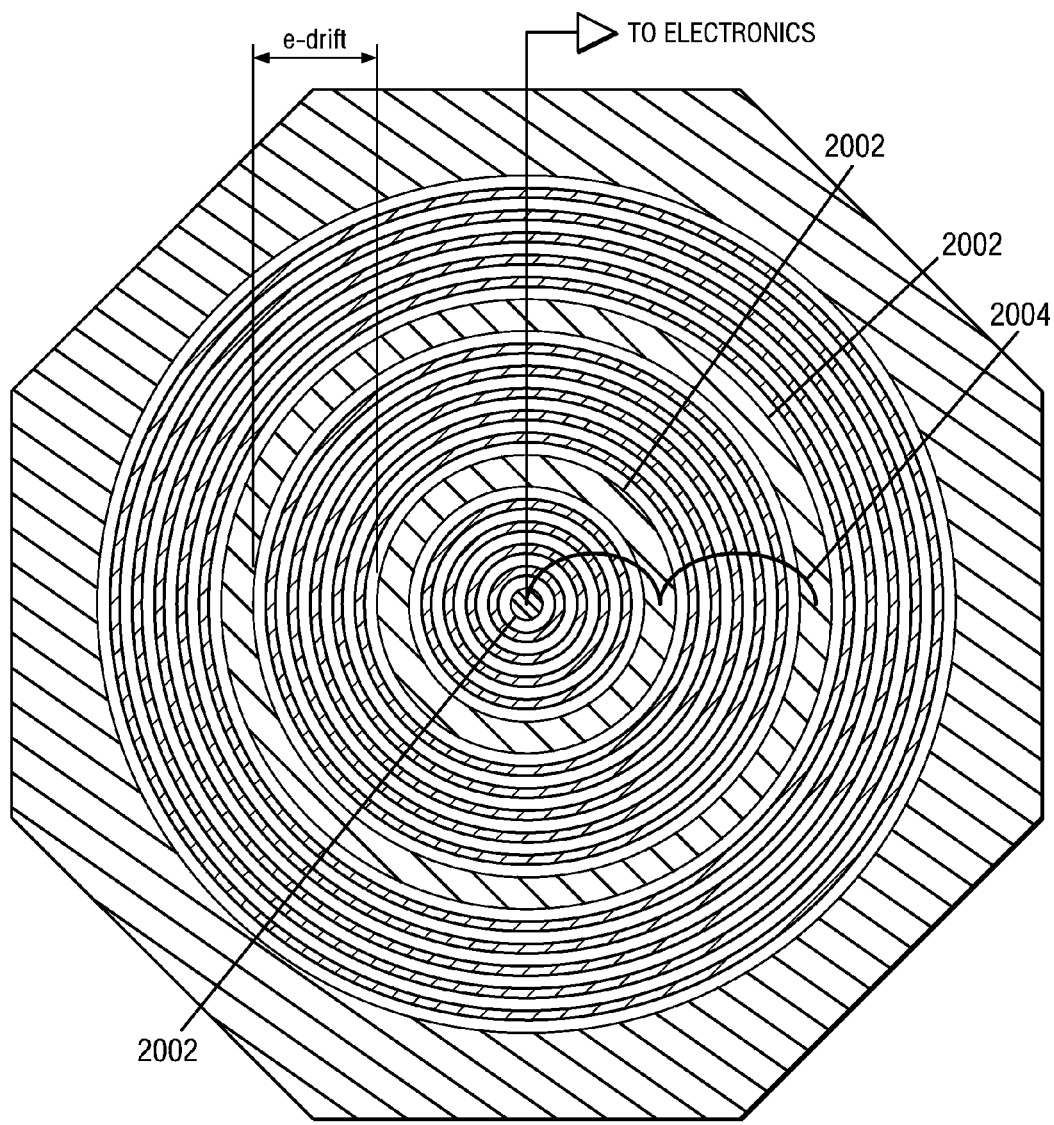
FIG. 20 is a depiction of a large area alpha-beta SDD detector having concentric ring-like anodes.

A circular-shaped SDD is beneficial for certain applications. In this SDD embodiment a plurality of "ring like" anodes surround steering electrodes such that the combination constitutes a "circular" large area SDD detector where the electron drift length is relatively small. FIG. 20 depicts such an embodiment of a circular-shaped large area alpha-beta detector having concentric, ring-like anodes (2002). In this embodiment, a bonding wire (2004) connects the anodes (2002).

Figure 21:
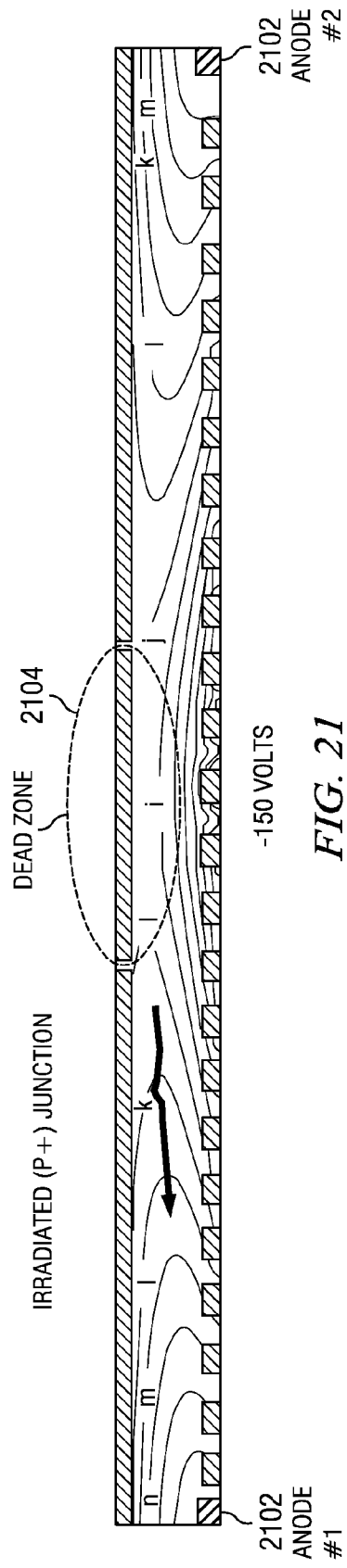
FIG. 21 is a cross section of a multi-anode circular structure.
Figure 22:
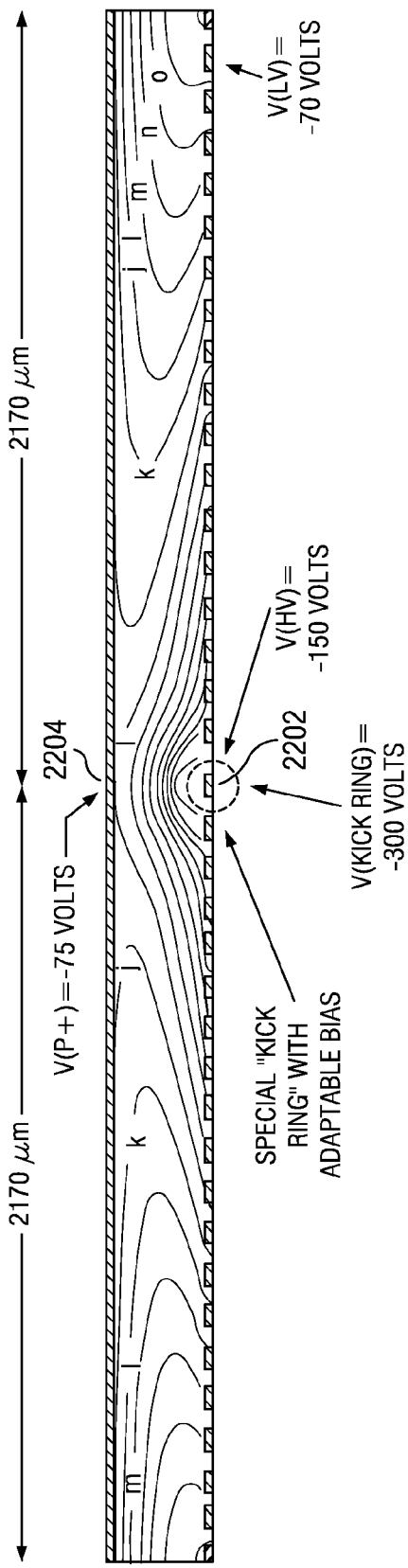
FIG. 22 is a cross section depicting the use of a kick ring.
Figure 23:
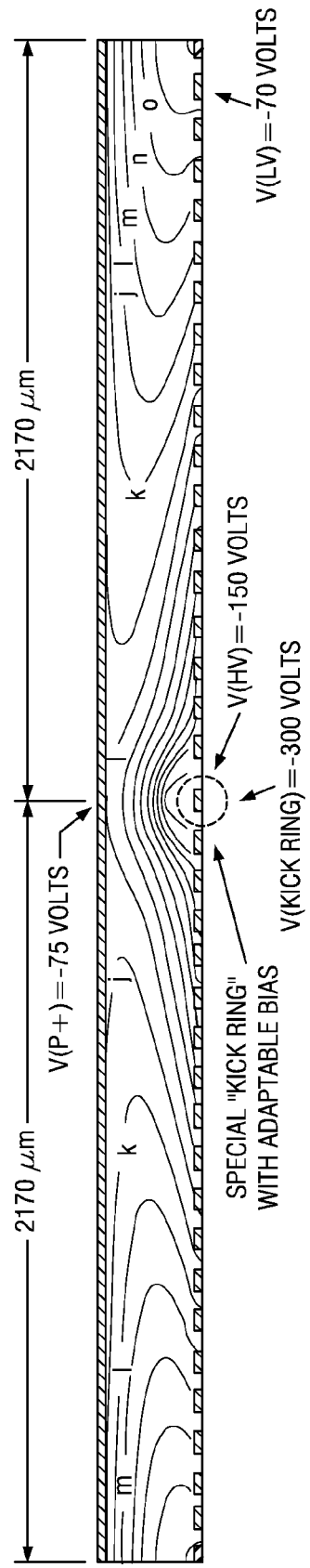
FIG. 23 is a depiction of an overlay of the equipotential lines of an embodiment of the present invention.
Figure 24A:
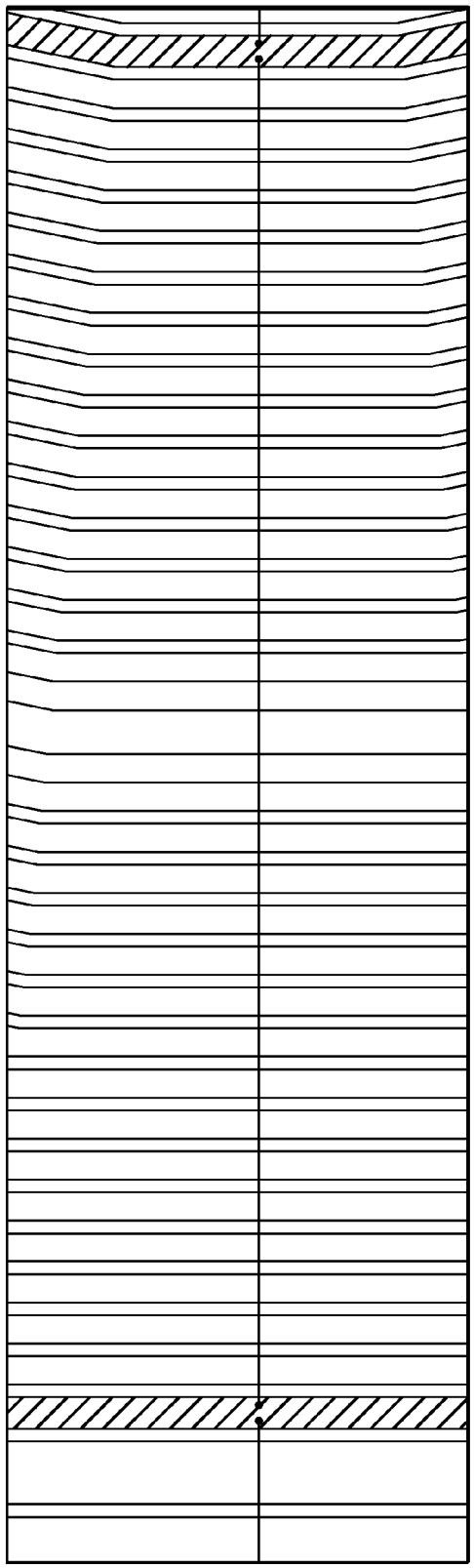
FIG. 24 is a close-up view of the embodiment using a kick electrode.
Figure 24B:
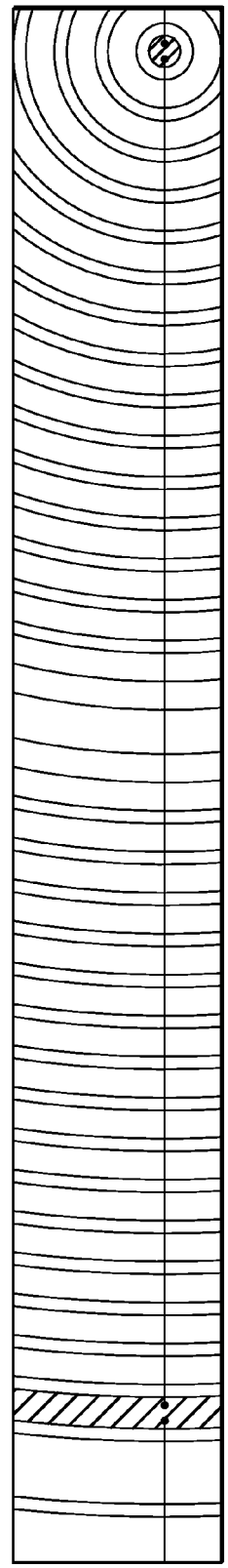
Figure 24C:
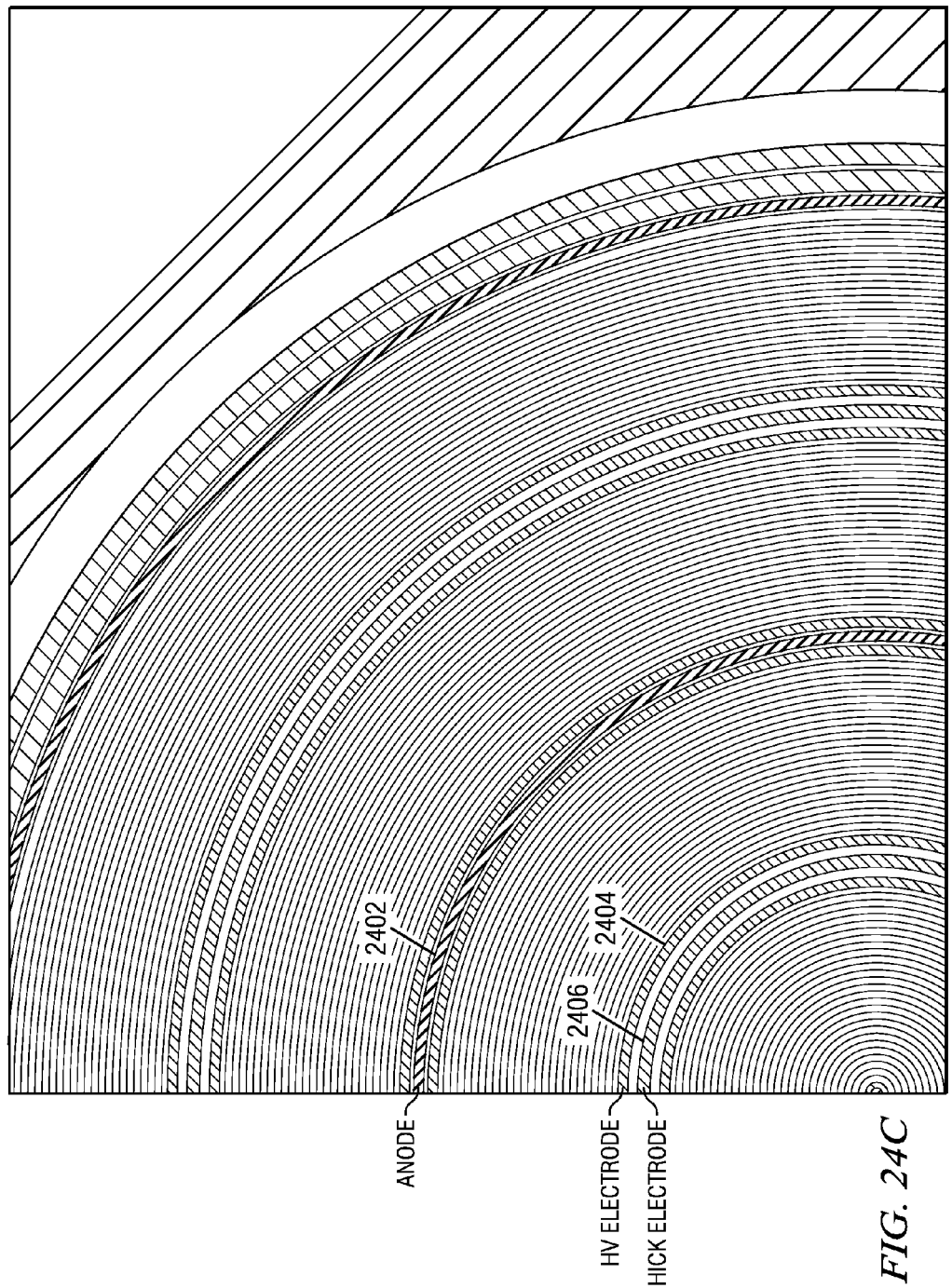
Figure 25:
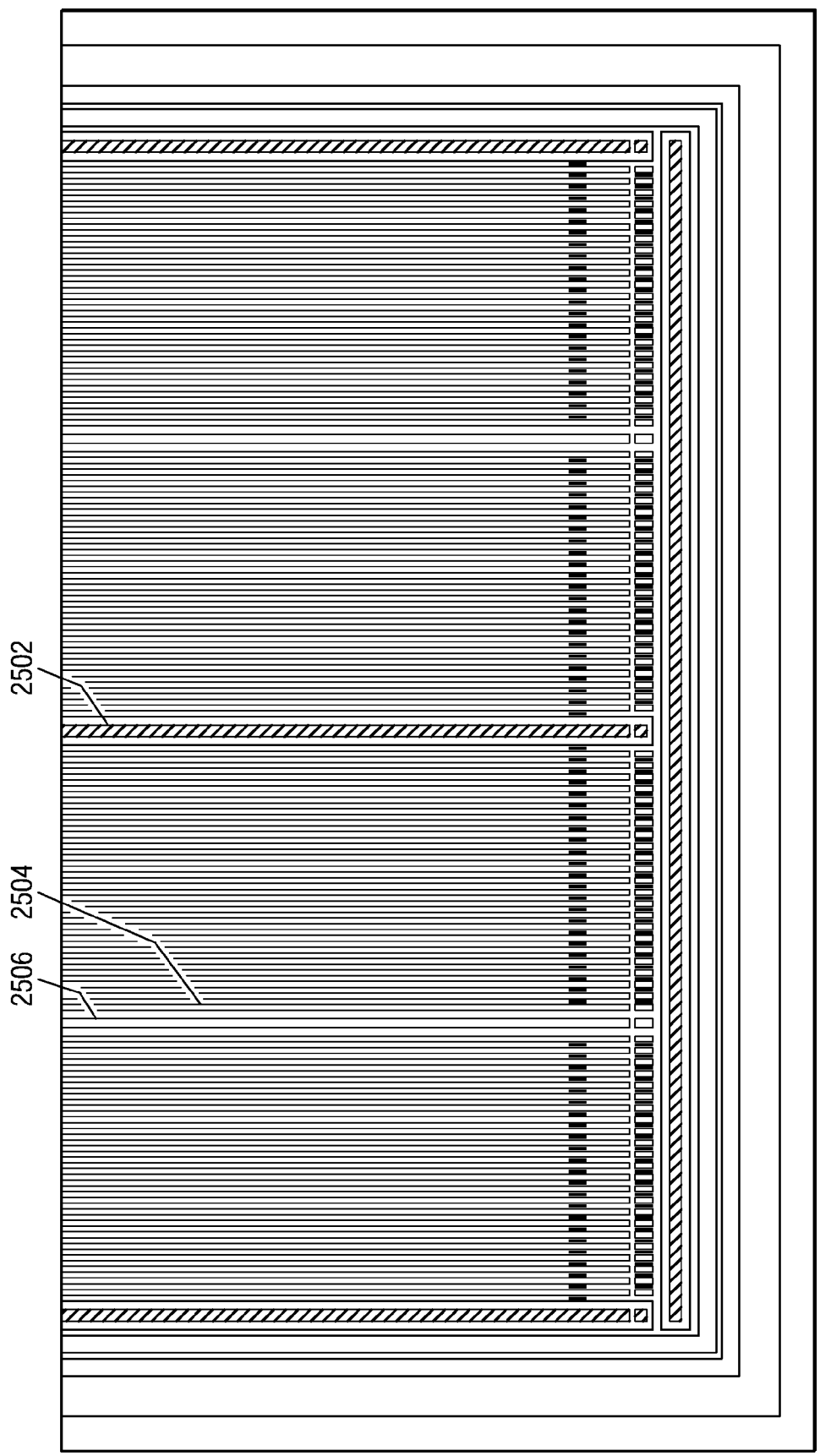
FIG. 25 is a depiction of a multi-anode segmented SDD detector having punctual anodes.

The electric field cross section of this multi anode circular-shaped SDD embodiment is depicted in FIG. 21. As shown, collection anodes (2102) are located on the lower right and the lower left part of the device. A low field region (2104) is seen in the middle between the two anodes, on the side of the irradiated junction. This electric field (2104) can be reduced by the use of a kick ring. A kick ring is a ring that is not linked to the other steering electrodes by a resistor. FIG. 22 shows an embodiment of such a cross section using a kick ring (2202). The bias of the kick ring can be adjusted such that the low field region on the irradiation side (2204) can be reduced as shown. FIG. 23A depicts an overlay of the equipotential lines and the structure of this embodiment. A close-up view of this circular-shaped embodiment of the SDD is depicted in FIG. 24A and FIG. 24B, which can be contrasted with the embodiment of the linear anode SDD of FIG. 25. FIG. 24C depicts a broader view of the circular-shaped embodiment, with the anode (2402), HV electrodes (2404), and kick electrode (2406) indicated. FIG. 25 depicts a linear anode SDD with the anode (2502), HV electrode (2504), and kick electrode (2506) indicated.

Multi-Anode Segmented SDD Detector Having Punctual Anodes

Figure 26:
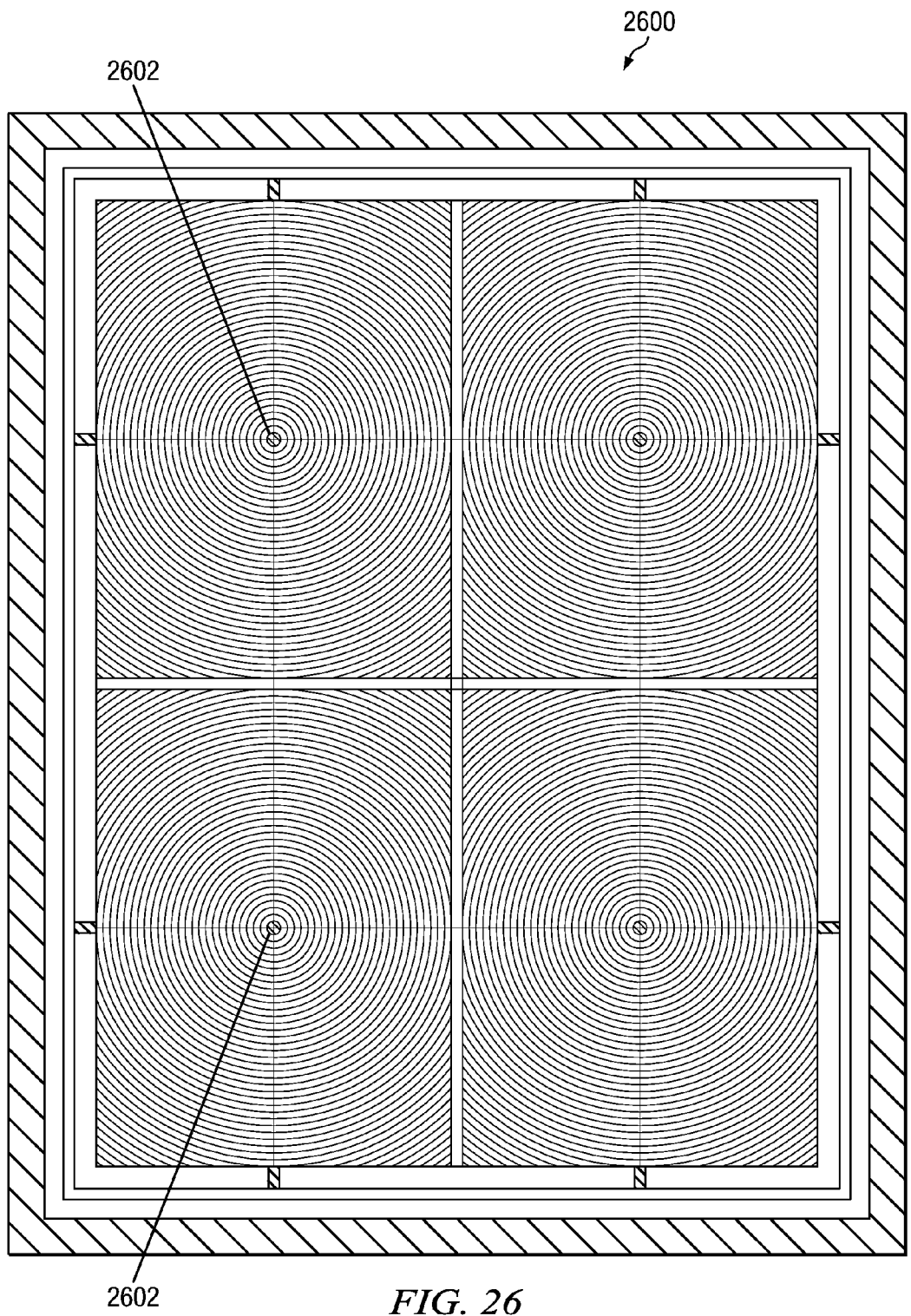
FIG. 26 is a depiction of a segmented SDD (SSDD) embodiment.

FIG. 26 depicts an embodiment of a multi-anode segmented SDD detector (2600) with punctual anodes (2602) that can be individually linked to FETs, or linked together with a connecting track on a ceramic substrate. This detector is a multi-anode detector that can be compatible with applications where the coupling to a scintillator is performed. This embodiment utilizes multiple SDDs with circular anodes (2602) arranged in repeating rectangular sections, both horizontally and vertically, as shown.

Figure 27:
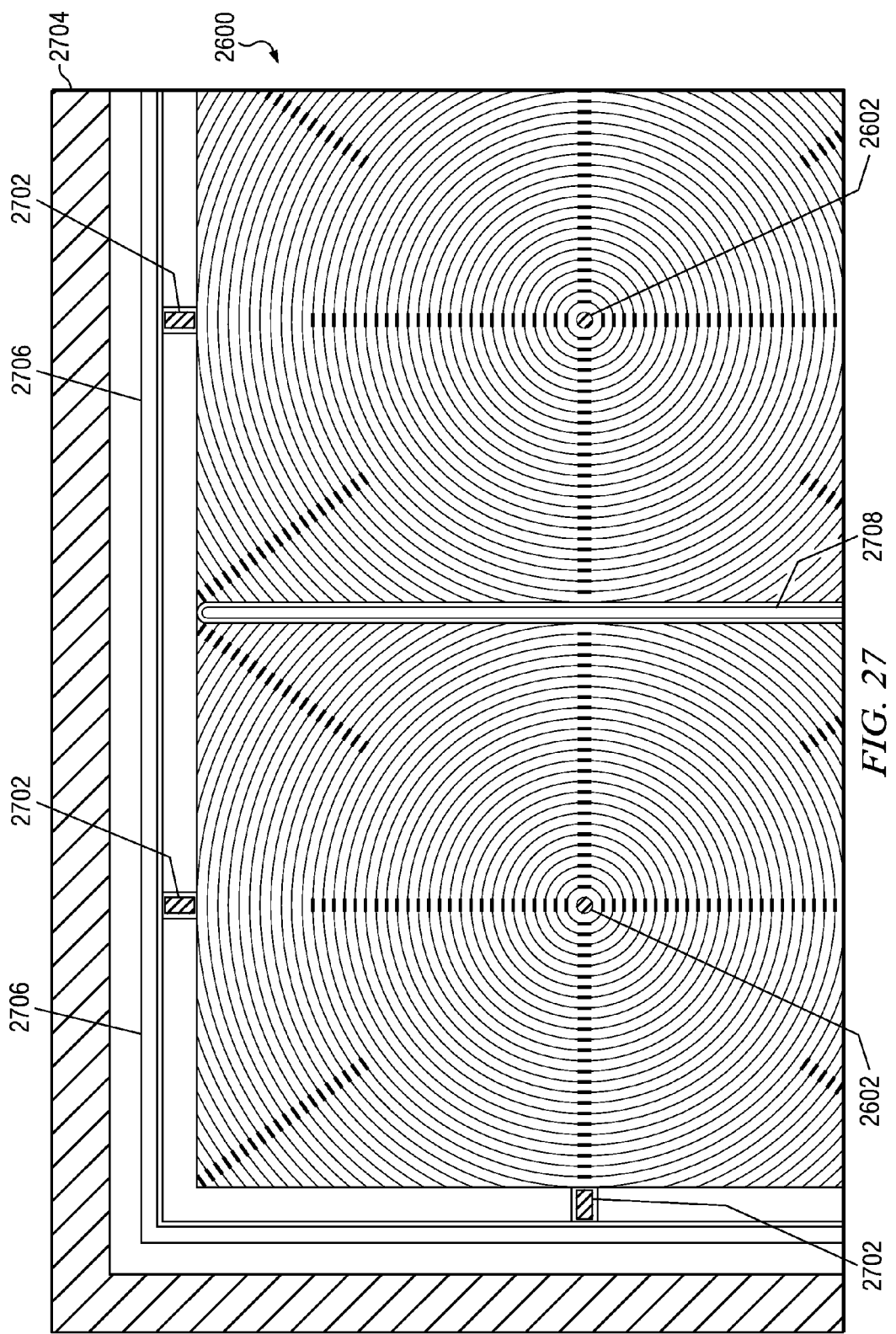
FIG. 27 is a close-up depiction of the SSDD embodiment.

FIG. 27 depicts a more detailed view of this embodiment. As shown, anodes (2702) are devised at the border of the detector in order to collect the lateral currents. Electrodes (2708) are positioned where an independent bias (i.e., kick electrodes) can be located between every elementary unit.

Kick electrodes (2708) in this embodiment are constructed of a series of rectangular heavily doped junctions separated by implanted resistors. The bias can vary in a linear way on these lines between the border and the center of the detector. However, a bias difference between the kick electrode (2708) and the steering electrodes can still be maintained. A guard ring (2706) and stop ring (2704) are also provided.

Figure 28:
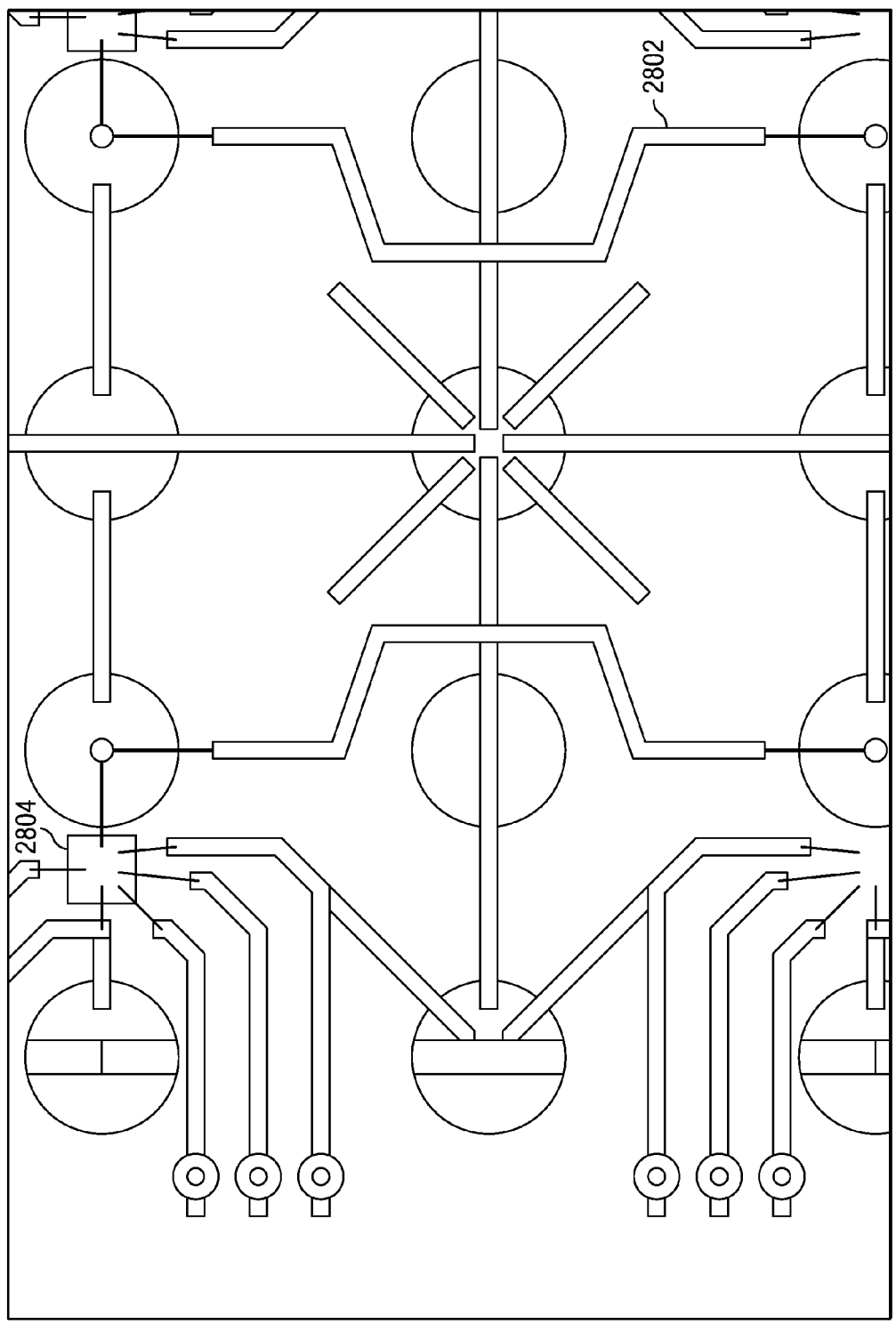
FIG. 28 is a depiction of inter anode connections as utilized in the embodiment.

FIG. 28 depicts the placement of inter-anode connections in the present embodiment. If the number of electronic channels in this embodiment must be smaller than the total number of anodes, tracks (2802) can be devised on the ceramic or interposer that will be glued on the detector. Several anodes can be bonded or flip chip connected to these tracks which can then be linked to one FET (2804) or first stage of an ASIC including a charge sensitive preamplifier.

In this embodiment, if sufficient anodes are designed and linked by connecting tracks (2802) the drift distance can be kept relatively small, enabling coupling with scintillators and efficiently reducing the ballistic deficit. Further, if the width of the connecting tracks (2802) is maintained sufficiently small, the lineic capacity can compete with the lineic capacity of a conventional linear anode.

Simplified SDD Detector With Interdigitated Anodes And P+ Electrodes

Figure 29:
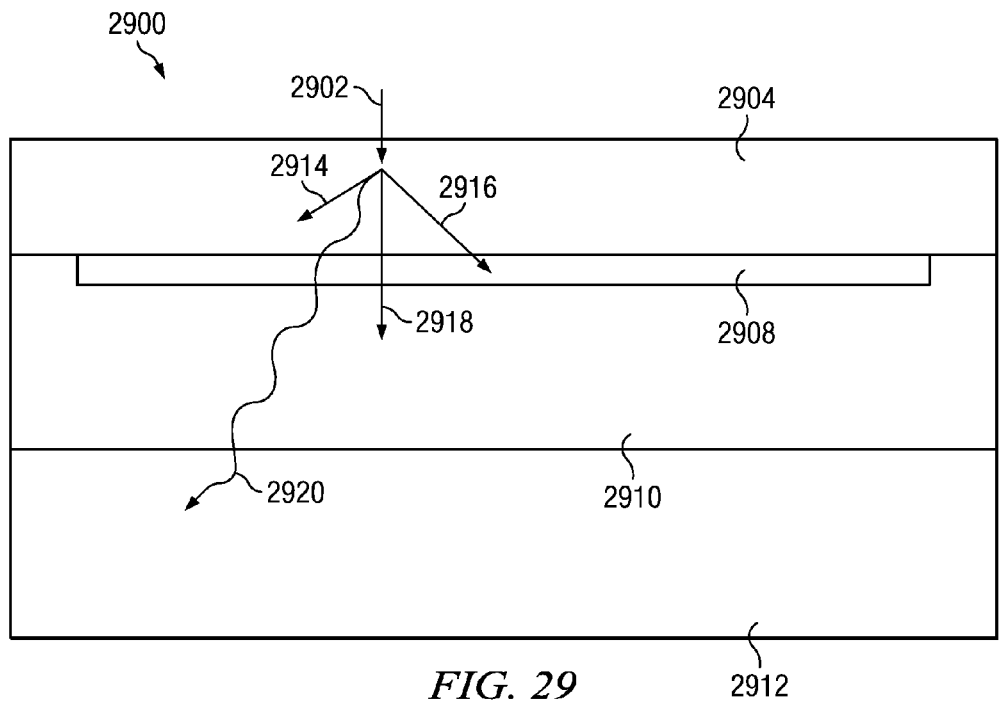
FIG. 29 is a depiction of a PIN neutron detector realized by epitaxy on heavily doped n+ substrate.

FIG. 29 depicts an embodiment of a PIN neutron detector (2900) realized by epitaxy on a heavily doped n+ substrate (2912). This detector features a neutron converter (2904) such as Boron, an n type epitaxial layer (2910) built upon a heavily doped n+ substrate (2912). As an incoming neutron (2902) strikes the neutron converter layer (2904), it splits into alpha and gamma particles. Alphas can be absorbed in the converter layer (2914), junction layer (2916), or epitaxial layer (2918), while the gamma passes to the substrate (2920).

Such a detector can also be realized by growing epitaxial layers on heavily doped p+ substrates. In an embodiment utilizing interdigitated anodes and p+ electrodes, the p+ heavily doped substrate serve as an electrode of an SDD device. The n+ anodes are implemented on the irradiation side of the device. In this embodiment, a limited number of electrodes can be applied on the irradiation side while still allowing a lateral drift to be obtained on this detector. Oxide areas between the p+ electrodes must also be limited in the area.

In this embodiment, only one or two p+ electrodes can be applied on the anode side that will be irradiated. An interdigitated structure can then be thought of where both anodes and p+ electrodes are rectangular, but where the surface of the anodes is smaller than the one of the p+ electrodes.

Figure 30:
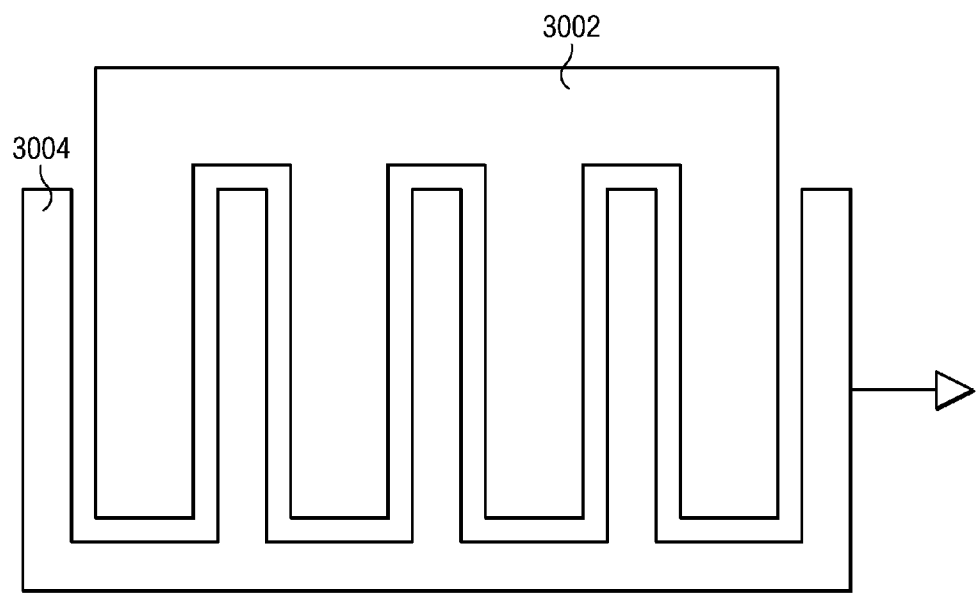
FIG. 30 is a cross sectional depiction of interdigitated anodes and p+ electrodes.

All anodes in this embodiment are linked in a "bus-bar anode" configuration. In this configuration, all p+ electrodes are lined by a p+ bus-bar. This structure makes use of "inter-digitated" anodes and p+ electrodes. An inter-digitated detector is a detector where a number of strip like anodes are linked together. FIG. 30 depicts this arrangement of the inter-digitated simplified SDD embodiment. This figure shows the biasing electrodes (3002) interwoven amongst the interdigitated anode (3004). The cross-section of this embodiment is further depicted in FIG. 31, with the electrodes (3002) and anodes (3004) shown on the epitaxial layer (3102).

Figure 32:
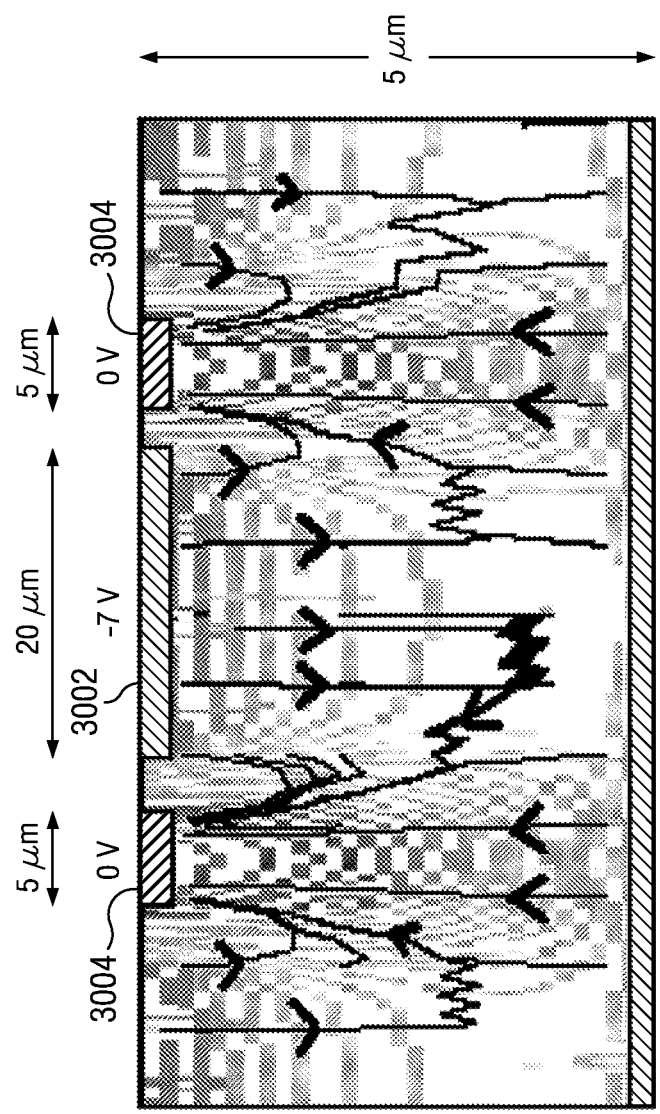
FIG. 32 is a depiction of the electron drift in the simplified SDD neutron detector.

FIG. 32 depicts the electron drift of this inter-digitated simplified SDD embodiment, superposed with its resultant equipotential lines. In all points within this detector, the electrons drift toward the collecting anodes (3004). The electrons starting from the middle region drift in a relatively slow fashion. This region can eventually be collimated utilizing a thick aluminum layer.

Figure 33:
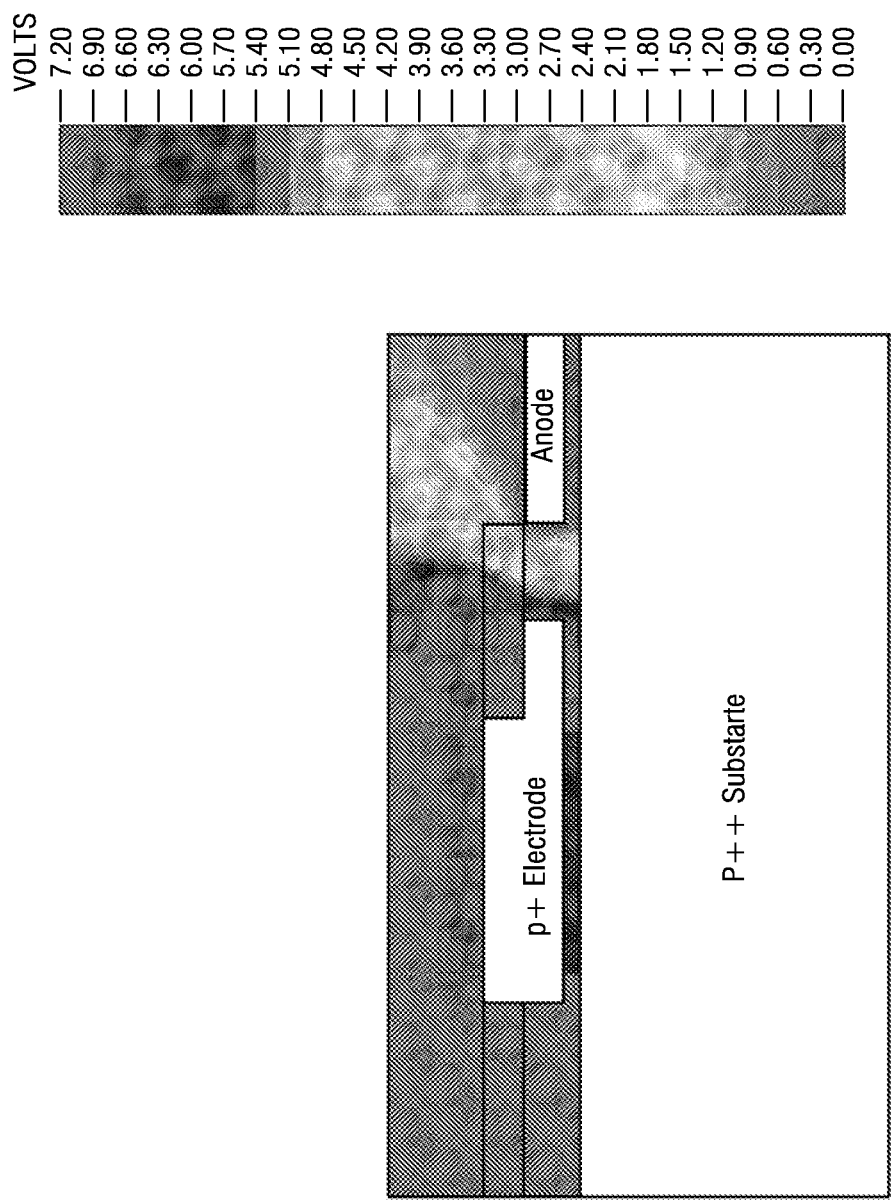
FIG. 33 is a depiction of capacitance modeling of the simplified SDD neutron detector.

Further, in this embodiment, the anode (3004) perimeter capacitance is based on finite elements modeling giving us a lineic capacitance of approximately 0.65 pF/cm between the anode and the p+ electrode (3002). In a 1 cm by 1 cm device the periodicity is 35 µm. The unit cell may thus be reproduced 285 times to create a detector. The back to plane capacitance in this embodiment is also approximately 600 pF (i.e., 2100 pF×10 µm anode/35 µm pitch) while the anode perimeter capacitance of an anode finger is approximately 380 pF (i.e., 2×0.65 pF/cm×285 2*0.65 pF/cm*285). Thus, the total capacitance of such a configuration is approximately 980 pF. FIG. 33 depicts a cross section and graph of the capacitance modeling of the present embodiment. Depending upon the peripheral support electronics, the gain in electronics resolution can be more than twice that of a standard detector. The energy threshold may be improved by a factor 2 as well.

Figure 34:
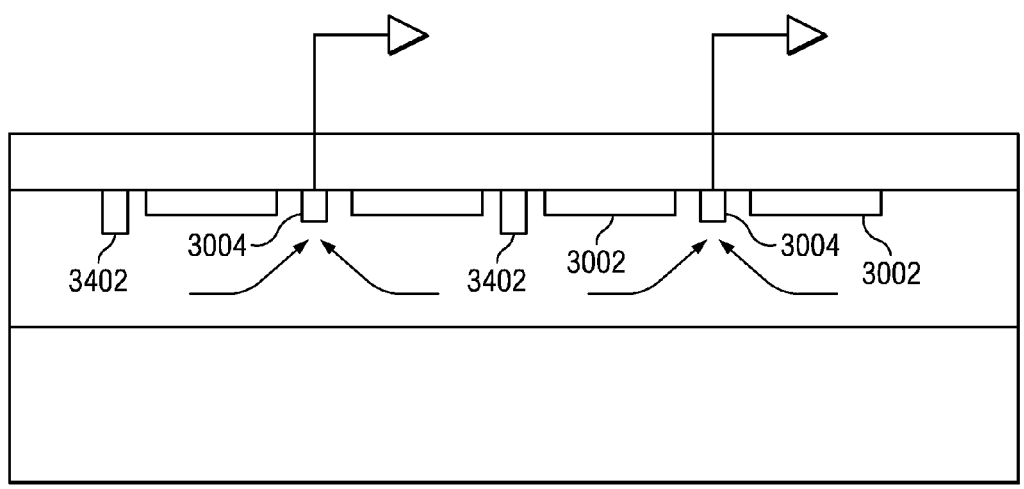
FIG. 34 is a depiction of the cross section of an embodiment of the simplified interdigitated SDD detector with a kick guard ring for enhancing lateral depletion.
Figure 35:
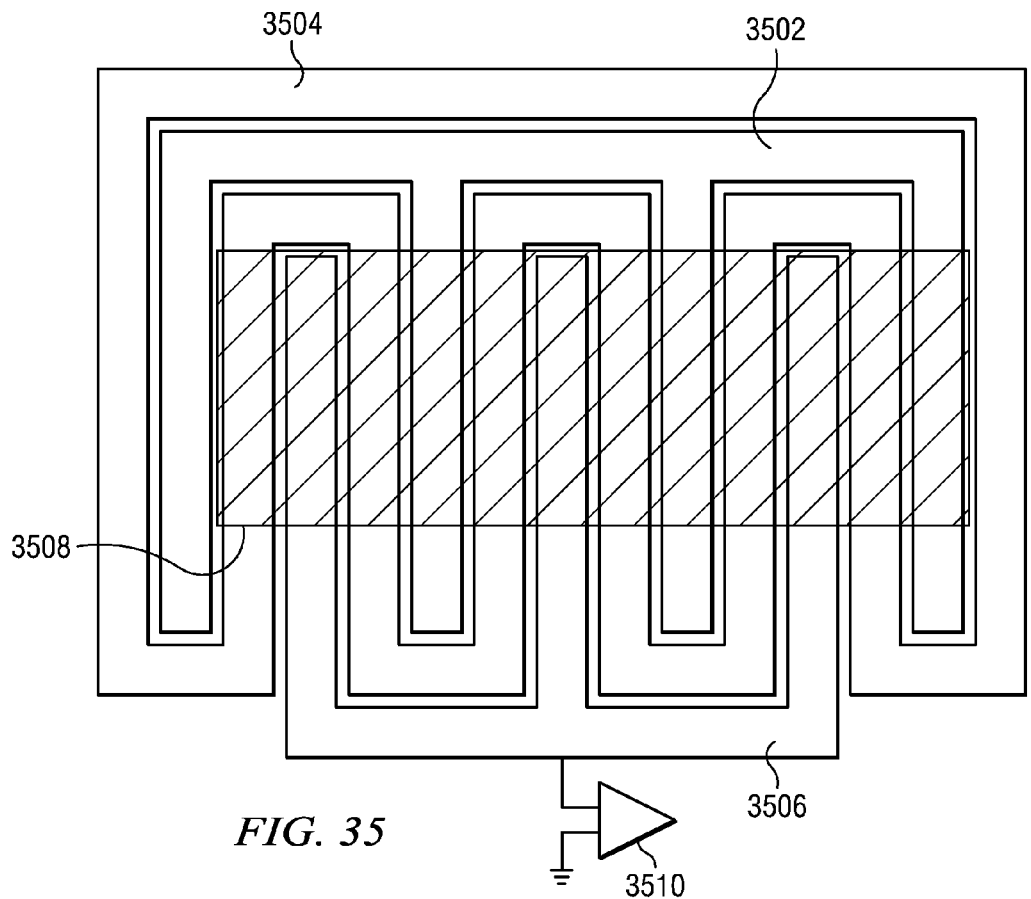
FIG. 35 is a top view of an embodiment of the simplified interdigitated SDD detector with a kick guard ring for enhancing lateral depletion.

The lateral pitch between the anodes may be further enhanced by using a simplified SDD structure such as described above, but completed by a "kick" guard ring (3402) being set at a higher depletion bias than the first p+ electrode (3002) surrounding the anode (3004). FIG. 34 depicts a cross-section of such an embodiment. In this embodiment, the kick electrode (3402) provides a lateral field allowing larger periodicities to be utilized. The top view of this embodiment of the detector is depicted in FIG. 35. As shown in this figure, the electrode (3504) surrounding the anode (3506) is biased at −5 V, while the "kick" guard ring (3502) is biased at −15 V to provide an additional lateral electric field. The anode is attached to the pulse shaping and detection circuitry (3510). This configuration results in an active area (3508—hatched area) that spans the interdigitated center portion of the detector.

Low Capacitance Neutron Detectors with Wrap Around Structures

In another embodiment, a wrap-around structure may be utilized to minimize the capacitance of the detector. This is used primarily for Ge detectors. Since the thickness of the epitaxial layer in such a detector is relatively small, a combination of RIE and plasma immersion implantation can be used in order to implant the boron junctions.

Figure 36:
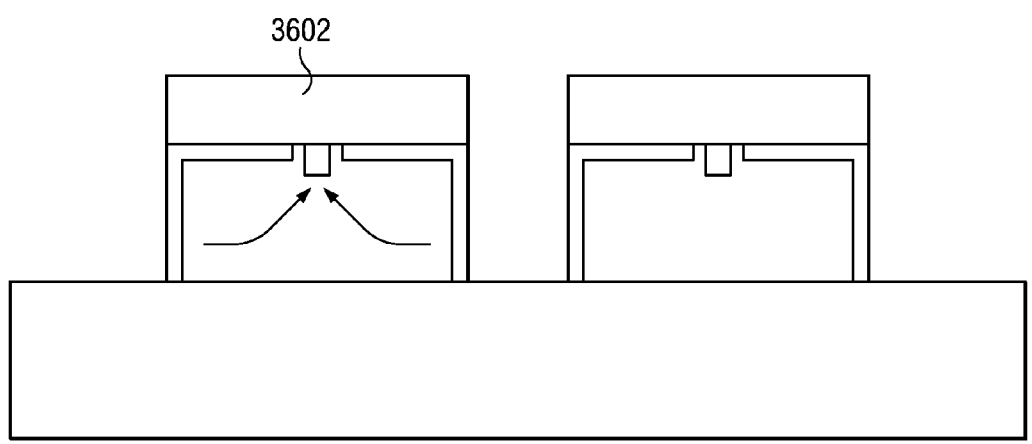
FIG. 36 is a depiction of an embodiment of the low capacitance neutron detectors with wrap around structures.

FIG. 36 depicts a cross section of the wrap-around embodiment. In this embodiment, converter layers (such as B10) (3602) are deposited on the front surface and sidewalls as well in order to provide a degree of texturing. This structure allows lower leakage currents then structures wherein a sidewall passivation technique is used and the junction is planar.

A large area SDD detector having a linear anodes and oblong-shaped steering electrodes surrounding the linear anodes, for applications wherein the detector is used for a direct detection of ionizing radiations (i.e., alphas, betas, and X-rays).

The active area of the SDD is rectangular with anodes at the extremity of the active area providing easy connection to the read-out electronics. The dimensions of the linear anode device possess aspect ratio of L/W dimensions higher then 2, provides shorter drift distances then with circular devices having the same active area and therefore reduces ballistic deficit.

These drift linear anode detectors can either be monolithic with 1 or 2 anodes or may possess a periodic array of rectangular anodes. In the case of an array of rectangular anodes, the advantage of these structures is the low capacitance in combination with a large area providing good beta efficiency and has drift lengths that do not create problems for ballistics.

A certain number of these anodes can be coupled together by bonding or interconnects. They can also be bonded to a "bus-bar" anode on the semiconductor or to a bus-bar metallic line deposited on an insulator on the silicon chip or on a ceramic.

The SDD above, further comprising linear anodes using a reverse bias of steering electrode close to the anode superior to 30 Volts, in order to minimize the lineic capacitance of the anode and to keep it under 2.5 pF/cm.

A large area SDD detector having linear anodes and oblong-shaped steering electrodes surrounding the linear anodes, for applications where the detector is used for a direct detection of ionizing radiations (i.e., alphas, betas, and X-rays). The dimensions of these linear anode devices possess aspect ratio of L/W dimensions higher then 2, provides shorter drift distances then with circular devices having the same active area and therefore reduces ballistic deficit.

This oblong shaped device will have its anodes at the center of the device and HV bias lines located close to the edge of the device. The oblong shape guarantees a better potential grading between the end of the linear anode and the upper and lower edges than a rectangular shape.

In the case of oblong drift detectors (above) or circular drift detectors, hexagonal or rectangular drift detectors: the use of a biasing configuration where the irradiation and anode stop rings (edge electrodes) are set at the same reverse bias.

These stop rings have been realized with a junction on the irradiation side and an ohmic contact on the anode side. The stop rings can also be made with a junction on the irradiation side and a junction on the anode side. The stop rings can also be made with an ohmic contact on the irradiation side and an ohmic contact on the anode side. The stop rings can also be made with an ohmic contact on the irradiation side and a junction on the anode side. The junctions can be realized using p+ (Boron, Gallium, etc.) doping or Schottky junctions.

A central anode drift detector (such as oblong, circular, hexagonal or rectangular drift detectors) utilizing a biasing configuration wherein the irradiation and anode stop rings (edge electrodes) are set at the same reverse bias. The detector comprising an additional ring between p+ electrode and the irradiation side stop ring and/or an additional ring between the HV steering electrode and the anode side stop ring, in order to prevent injection current from the edge to the active area.

Setting both stop rings at reverse biases different than ground or floating has several advantages.

Collection area: Using an irradiation junction (P+) bias equal to the largest bias of steering electrode (HV) bias and using a "anode side" and "irradiation side" stop ring reverse bias that is halve of the bias of P+ or HV, it has been proven theoretically and experimentally that these structures provide better collection areas than SDDs where both stop rings are set to ground or left floating.

Setting biases of the anode stop ring and irradiation side stop ring to the same reverse bias as main irradiation junction (p+) has proven to be an efficient structure concerning collection provided that the HV bias of the highest steering electrode is superior to the bias of the irradiation P+ junction. By simulation we have proven that the whole irradiation P+ side can be realized in one single continuous junction covering substantially all of one side of the detector. This allows the use of single sided processing technology.

An SDD detector having either an oblong-shape or a circular shape comprising a continuous P+ junction on the irradiation side. The bias of this continuous junction is the same as the bias of anode side stop ring. They can be linked together in order to reduce the resistance between them.

Since a continuous junction is used, no high quality oxide is needed to isolate the several junctions that were present on the irradiation side in former designs.

A gettering process for n-type substrates, the method steps comprising: (a) Implementation of all electrodes on the anode side; (b) Phosphorous doping (such as implantation, POCL3 diffusion . . . ) on the irradiation side; (c) Annealing at temperature between 850° C. and 1100° C. for periods ranging from 10 minutes to 10 hours; (d) RIE with HBr or other compounds of the phosphorous layer; (e) LPCVD SiO2 deposition or E-beam SiO2 deposition; (f) Doping of a thin junction (boron or Ga); (g) Activation and annealing; (h) Annealing activation between 700° C. and 900° C. for periods ranging from 5 minutes to several hours in a furnace; (i) Excimer laser annealing for energy densities of 0.8 J/cm2; and (j) Oxide etching on the irradiation side.

The method above further comprising: a side contact evaporation after dicing or trough groove metallization prior to dicing has then to be performed in order to short circuit the anode side stop ring and the irradiation side stop ring and thus avoiding noise from the bulk resistance.

An SDD drift linear anode detector comprising a periodic array of rectangular anodes (which can be monolithic or separate devices), for applications where SDDs are coupled to scintillators. These scintillators can either convert gammas to visual photons (e.g., CsI, LaBr, and NaI) or neutrons to visual photons (LiF). The advantage of this approach is that for a given area, if the L/W ratio is large enough, the drift length of electrons will be smaller than for a circular drift detector, enabling the use if lower shaping times. In an SDD coupled to a scintillator, visual photons will reach the SDD in different parts of the device: their distribution spreads out between the anode and the high voltage bias. Consequently, a shaping time as large as the drift time of the longest electrons path has to be used. In large area circular SDDs, short shaping times cannot be used advantageously.

Segment areas can typically range between 100 and 500 mm2. The drift lengths can be between 1 mm and 10 mm. The lengths of these segments can range between 1 cm and 10 cm.

A certain number of these anodes can be coupled together by bonding or interconnects. They can also be bonded to a "bus-bar" anode on the semiconductor or to a bus-bar metallic line deposited on an insulator on the silicon chip or on a ceramic.

An SDD linear drift detector comprising a periodic array of rectangular anodes or applications where SDDs are used for direct X-ray or low energy gamma detectors.

Since the HV steering electrode is located in the middle between the two anodes, the "saddle point" which is the limit point where electron drift direction changes will be located below the HV steering electrode.

Devices with central anodes (traditional circular SDDs, oblong shapes, triangular bus-bars) have a HV steering electrode close to the edge of the device and have a saddle point located inside the contour of the HV ring, therefore losing active area, unless an external guard ring is used for shifting the saddle point position. This additional guard ring takes space and reduces the fill factor when tiling is required. A rectangular detector with linear anodes will have a slightly worse resolution due to their higher capacitance but allows for a more efficient fill factor for large areas.

An SDD linear drift detector comprising a concentric array of ring anodes for very large detection areas: >400 mm2 for large area alpha-beta detection. These detectors are divided into several ring segments between 2 up to tenths of segments. These anode rings can be connected between each other by the means of bonding or interconnect technologies.

The advantage of these structures is that they be of large area, and have drift lengths that do not create problems for ballistics. The circular shape of the detector is well adapted to existing mounting frames, allows the insertion of the device in drilled circular cavities which are often preferred to rectangular cavities.

An SDD detector comprising independently bias-able rings located in the middle between two anodes rings that are not linked to the "high voltage" ring, which is the last ring linked to the divider network. These rings can be used on linear anode SDDs or circular SDDs with ring anodes. An example of their location is shown on FIG. 21. The advantage of having a ring where an independent bias can be set is that setting them under high reverse bias allows the reduction of the dead field regions on the irradiation side, opposite to the anode side. Struder also mentioned the use of rings for reducing the dead field regions in his patent, but they are located on the side that will be irradiated.

An SDD detector comprising a linear anode or the ring anode for applications where the SDD is coupled to a scintillator where the interanode distance is greater or equal to the distance mentioned in the table below and going to values of 20 mm. The minimal distance is stated for different generation lifetime values. For linear anode SDDs, the values below are computed for an anode length of 4 cm. For other linear anode distances, this table can be recomputed by the previously mentioned formulas, and these minimal distances are also protected. (See FIG. 39.)

We protect the use if inter-anode distances on linear SDDs going from 0.4 mm and 20 mm on linear anode designs for a typical anode length of 4 cm or the equivalent using our formulas for other anode lengths. On ring anode SDDs the anode distances range between 0.4 mm and 20 mm.

A tiled sectioned SDD wherein segmented silicon drift detectors made of elementary circular SDDs which are cut into rectangles and tiled next to each other (FIG. 26 and FIG. 27). A concentric series of circular electrodes is still present in this design and ensures electric field symmetry. This is thus enabling homogenous high drift fields. The largest electric fields generally ensure a lower probability for trapping and reduce the impact of electron spreading; however the pinch-off can not be exceeded. Above the "pinch off" bias, an SDD will loose most of its collection towards the anode.

The rectangular SSD above, wherein the SDD can be separated by an independent kick electrode that can be independently biased from the concentric electrodes network. This electrode itself has an elongated rectangular shape and is made from a series of small rectangular junction's separated by implanted resistors so that the bias of these rings can be varied in a linear way from border to center. Using the appropriate rectangular aspect ratio and the appropriate size of rectangle, several anodes can be connected together on an interposer ceramic or semiconductor.

The SDD of above, wherein anodes are flip chipped or bonded to a common bus-bar linking all anodes on a ceramic. Provided that the width of this bus-bar is small enough, the lineic capacity of this bus-bar approximates the lineic capacity of linear anode SDDs (FIG. 28).

The SDD of above wherein the anodes are interconnected using on-chip metallization. Provided that the width of the connection lines and the value of the dielectric are small enough, the lineic capacity of this interconnected anode SDD approximates the lineic capacity of linear anode SDDs.

In the case of detectors coupled to scintillators: an array of linear anode SDDs comprising resistive anodes for 2D localization of the point of interaction in the scintillator. In the x direction, the retracing of this component is given by the weighting of intensities coming on every ASIC channel, and localization of the centroids. In the y direction, this information is given by the weighting of the signal coming on FETs located at both ends of the anode, if these anode pads are resistive.

Figure 31:
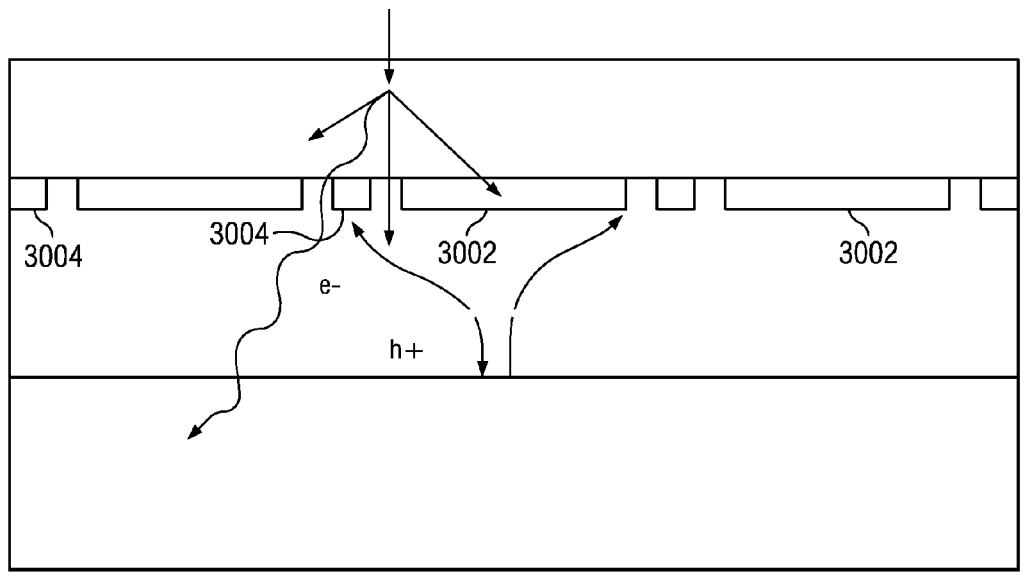
FIG. 31 is a cross sectional depiction of an embodiment of the interdigitated simplified SDD for neutron conversion.

An inter-digitized SDD comprising simplified electrodes structures surrounding the anode (one depletion electrode next to the anode replacing a multiple of steering electrodes), for either neutron detection applications with B10 or Li7 converters or for scintillation applications (FIG. 30 and FIG. 31).

In the case of neutron detectors, the advantage of such a structure lays in the fact that the traditional high capacitance of 1D detectors realized on epitaxial layers can be lowered by having a fraction of anode area to total detector area fraction that is smaller than for a 1D detector. Since this detector is planar, it is relatively easy to realize. The inter-digitized structure does not require any bonding between the anodes or any interconnects, making the process simple and affordable for large series productions.

The SDD of above wherein the lateral pitch between the anodes is enhanced by using a simplified SDD structure such as described in claim 12, but completed by a "kick" guard ring being set at a higher depletion bias than the first p+ electrode surrounding the anode. This kick electrode provides a better lateral field, allowing larger periodicities to be used (see FIG. 34 and FIG. 35).

A low capacitance detector for neutron detection wherein the p+ electrode surrounding the anode is implemented in a wrap around geometry (FIG. 36).

The advantage of such a wrap around geometry is that the electron drift time is smaller than for a simple planar interdigitated simplified SDD detector. An additional advantage is that they are compatible with texturing.

Having a wrap around junction on the whole island can be better than having only the junction on the top of the island and lateral passivation at the edges (by SiO2 or other traditional means) since wall passivations are not optimal concerning generation and recombination, resulting in high leakage currents.

An SDD wherein one undivided p+ electrode surround the anode, with an "kick" external guard ring allows to push up the lateral electric field on the anode side and/or the irradiation side. The role of this kick ring will be to provide a lateral electric field.

Figure 40:
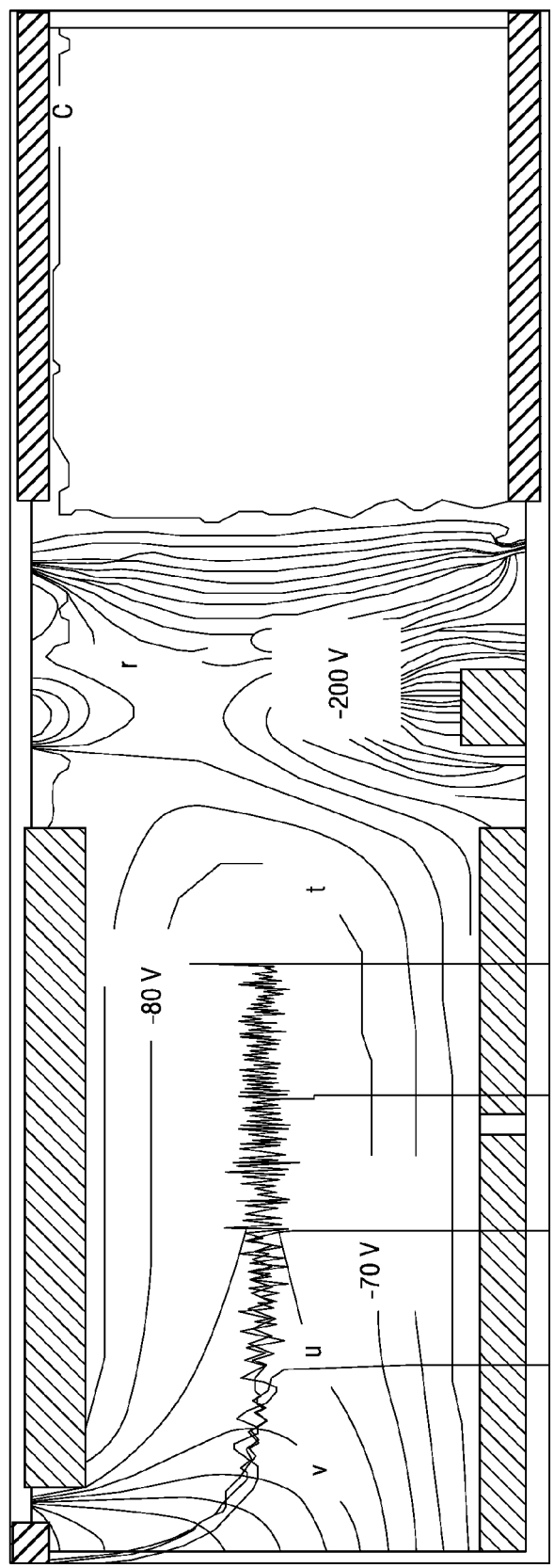
FIG. 40 is a graph depicting the drift current for various bias voltage values.

Using an external kick ring instead of using steering electrodes surrounding the anode allows saving one implantation as well as the possibility to irradiate from the anode side, since the steering electrodes are replaced by a large continuous junction surrounding the anode. In traditional SDDs, many concentric junctions surround the anode and isolating oxide separates them. If ionizing radiation is absorbed in a region that is located under the oxide, a poor collection will occur and next to this the dead layer is thicker then with a continuous electrode (FIG. 40).

A method for selective deposition of ARC layers by the means of E-beam evaporation (such as Ta2O5, Zn Sans Si3N4) on parts of the devices that do not comprise metal by the means of the liftoff technique, using photoresist to mask the metal contacts: to see and clarify with AMO.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A large area silicon drift detector (SDD) device for use in direct detection of ionizing radiation, the SDD device comprising:
    a silicon substrate material;
    at least one linear anode; and
    a plurality of steering electrodes with each electrode having at least a portion that is linear and that is positioned in parallel with the at least one anode, wherein the electrodes are operable at a bias voltage that is independent of the bias voltage applied to the anode and wherein at least the electrode in closest proximity to the anode is operable at a bias voltage that is independent of the bias voltage applied to the remaining electrodes.

2. The SDD device of claim 1 wherein the steering electrodes further include an arcuate portion in concentricity with the ends of the linear anode.

3. The SDD device of claim 2 wherein the device has an overall length to width dimensional aspect ratio of greater than 2.

4. The SDD device of claim 1 further comprising: a plurality of linear anodes.

5. The SDD device of claim 4 wherein the linear anodes are electrically coupled by a bus-bar anode.

6. The SDD device of claim 4 wherein the steering electrodes are linear and wherein the anodes are arranged in a periodic array with each anode separated by several steering electrodes.

7. The SDD device of claim 2 wherein the outermost electrodes are located near the outer edge of the device and operate with a high-voltage bias.

8. The SDD device of claim 1 further comprising: a plurality of stop rings operable at a bias voltage that is independent of the anode and the electrodes.

9. The SDD device of claim 1 further comprising: a continuous P+ junction covering substantially all of the irradiation side of the device.

10. The SDD device of claim 1 further comprising: a scintillation material coupled to the substrate.

11. The SDD device of claim 4 further comprising: a scintillation material coupled to the substrate, wherein the interanode distance is chosen from the group consisting of 0.25 mm, 0.34 mm, 0.43 mm, 0.54 mm, 0.68 mm, and 0.87 mm.

12. The SDD device of claim 6 further comprising: a kick electrode separating each anode array, wherein the kick electrode is operable at a bias voltage that is independent of the anode and the electrodes.

13. The SDD device of claim 12 wherein the kick electrode has an elongated rectangular shape and is made from a series of small rectangular junctions separated by implanted resistors, wherein the kick electrode bias voltage may be varied linearly from the border of the device to the center of the device.

14. An interdigitated SDD radiation detection device, the SDD device comprising:
    an N-type epitaxial layer bonded with a heavily doped P+ substrate material;

a plurality of N+ anodes implemented on the epitaxial layer and linked at one end of the anodes for electrical continuity;

a plurality of P+ electrodes implemented on the epitaxial layer and linked at one end of the electrodes for electrical continuity, wherein the unconnected end of the electrodes is interdigitated with the plurality of anodes; and a neutron converter material bonded with the epitaxial layer upon which the anodes are implemented.

15. The interdigitated SDD device of claim 14 further comprising: a kick guard ring implemented within the structure of the electrodes yet electrically isolated from the electrodes such that the kick guard ring may operate at a bias voltage that is independent of the electrode voltage.

16. The interdigitated SDD device of claim 15 wherein the electrodes wrap around substantially all of the top surface and the side surfaces of the respective anodes.

17. A large area silicon drift detector (SDD) device for use in direct detection of ionizing radiation, the SDD device comprising:

a silicon substrate material;

at least one anode; and a plurality of steering electrodes in concentricity with the at least one anode, wherein the electrodes are operable at a bias voltage that is independent of the bias voltage applied to the anode and wherein at least the electrode in closest proximity to the anode is operable at a bias voltage that is independent of the bias voltage applied to the remaining electrodes; and a plurality of concentric anodes, wherein each anode is separated by a plurality of steering electrodes.

18. The SDD device of claim 17 wherein the outermost electrodes are located near the outer edge of the device and configured to operate with a high-voltage bias voltage.

19. A large area silicon drift detector (SDD) device for use in direct detection of ionizing radiation, the SDD device comprising:

a silicon substrate material;

at least one anode;

a plurality of steering electrodes in concentricity with the at least one anode, wherein the electrodes are operable at a bias voltage that is independent of the bias voltage applied to the anode and wherein at least the electrode in closest proximity to the anode is operable at a bias voltage that is independent of the bias voltage applied to the remaining electrodes; and a plurality of stop rings operable at a bias voltage that is independent of the anode and the electrodes.

20. The SDD device of claim 19 further comprising: a continuous P+ junction covering substantially all of the irradiation side of the device.

21. A large area silicon drift detector (SDD) device for use in direct detection of ionizing radiation, the SDD device comprising:

a silicon substrate material;

at least one anode;

a plurality of steering electrodes in concentricity with the at least one anode, wherein the electrodes are operable at a bias voltage that is independent of the bias voltage applied to the anode and wherein at least the electrode in closest proximity to the anode is operable at a bias voltage that is independent of the bias voltage applied to the remaining electrodes; and a scintillation material coupled to the substrate, wherein the interanode distance is chosen from the group consisting of 0.25 mm, 0.34 mm, 0.43 mm, 0.54 mm, 0.68 mm, and 0.87 mm.

* * * * *

UNITED STATES PATENT AND TRADEMARK OFFICE
CERTIFICATE OF CORRECTION

PATENT NO. : 8,421,172 B2
APPLICATION NO. : 12/838267
DATED : April 16, 2013
INVENTOR(S) : Massimo Morichi et al.

It is certified that error appears in the above-identified patent and that said Letters Patent is hereby corrected as shown below:

In the Specification:
Column 2, Line 30, please delete "if" and insert --of--.

Column 3, Line 40, please delete "in" and insert --irr--.

Column 4, Line 56, please delete "with" and insert --while--.
Column 4, Line 60, please insert --a-- after "make".

Column 7, Line 21, please delete --a-- after "with".

Column 8, Line 15, please delete "in" and insert --irr--.
Column 8, Line 26, please delete "in" and insert --irr--.
Column 8, Line 27, please delete "in" and insert --irr--.
Column 8, Line 35, please delete "in" and insert --irr--.
Column 8, Line 51, please delete "in" and insert --irr--.
Column 8, Line 60, please insert --s-- after "temperature".

Column 11, Line 21, please insert --of-- after "factor".
Column 11, Line 52, please delete --a-- after "having".

Column 12, Line 52, please delete "halve" and insert --half--.

Column 13, Line 1, please insert --an-- before "anode".
Column 13, Line 32, please delete "if" and insert --of--.

Signed and Sealed this
Sixth Day of August, 2013

Teresa Stanek Rea
*Acting Director of the United States Patent and Trademark Office*